Sept. 30, 1952 W. J. KEITH 2,612,084
CAPMAKING MACHINE
Filed Oct. 25, 1946 20 Sheets-Sheet 1

Inventor
WILLIAM J. KEITH,
By
J. Pinton Swecker Attorney

Sept. 30, 1952 W. J. KEITH 2,612,084
CAPMAKING MACHINE
Filed Oct. 25, 1946 20 Sheets-Sheet 2

WILLIAM J. KEITH,
Inventor
By
Attorney

Sept. 30, 1952 W. J. KEITH 2,612,084
CAPMAKING MACHINE
Filed Oct. 25, 1946 20 Sheets-Sheet 3
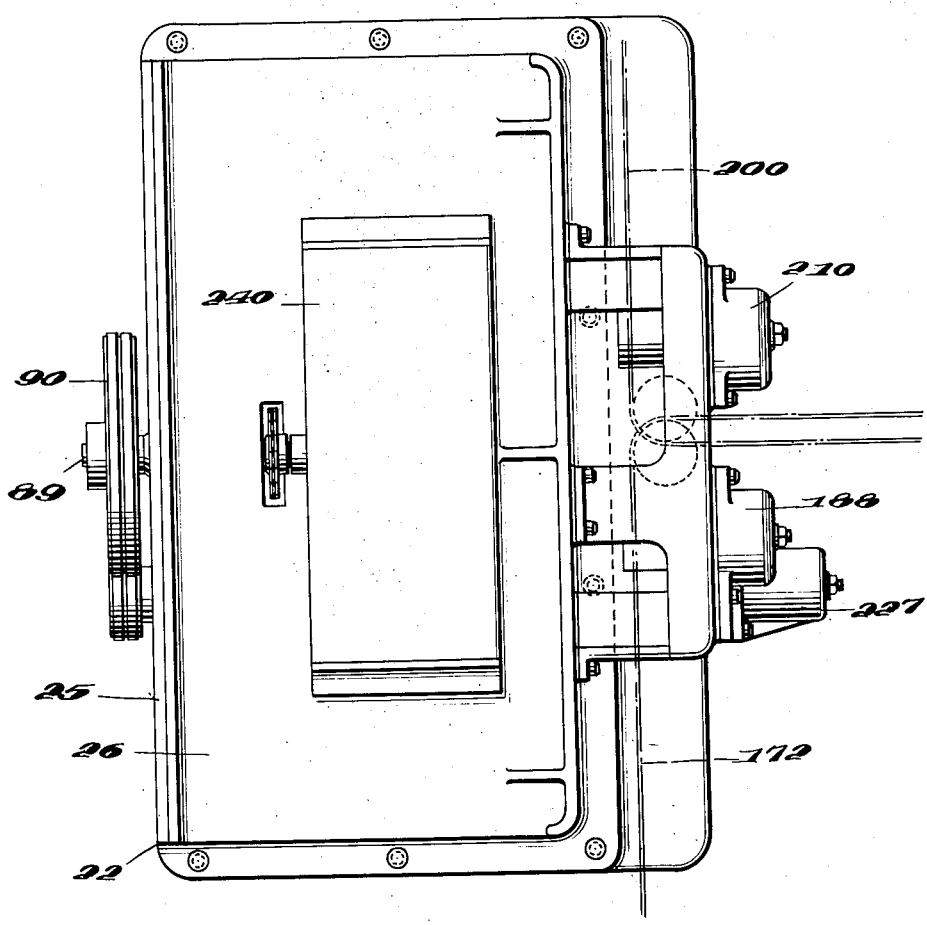
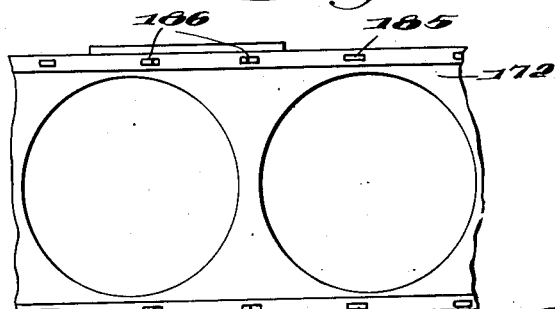
Inventor
WILLIAM J. KEITH,

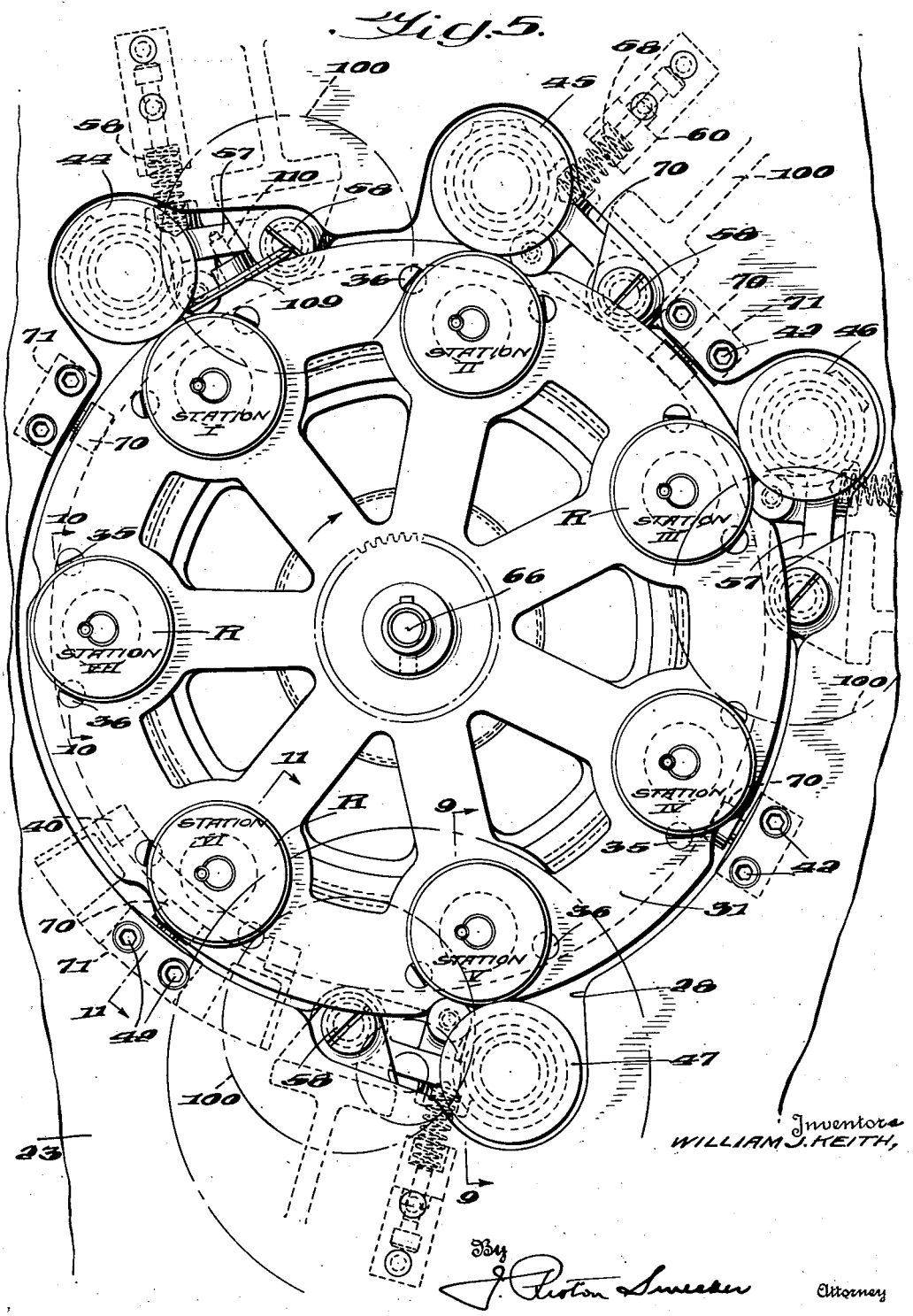

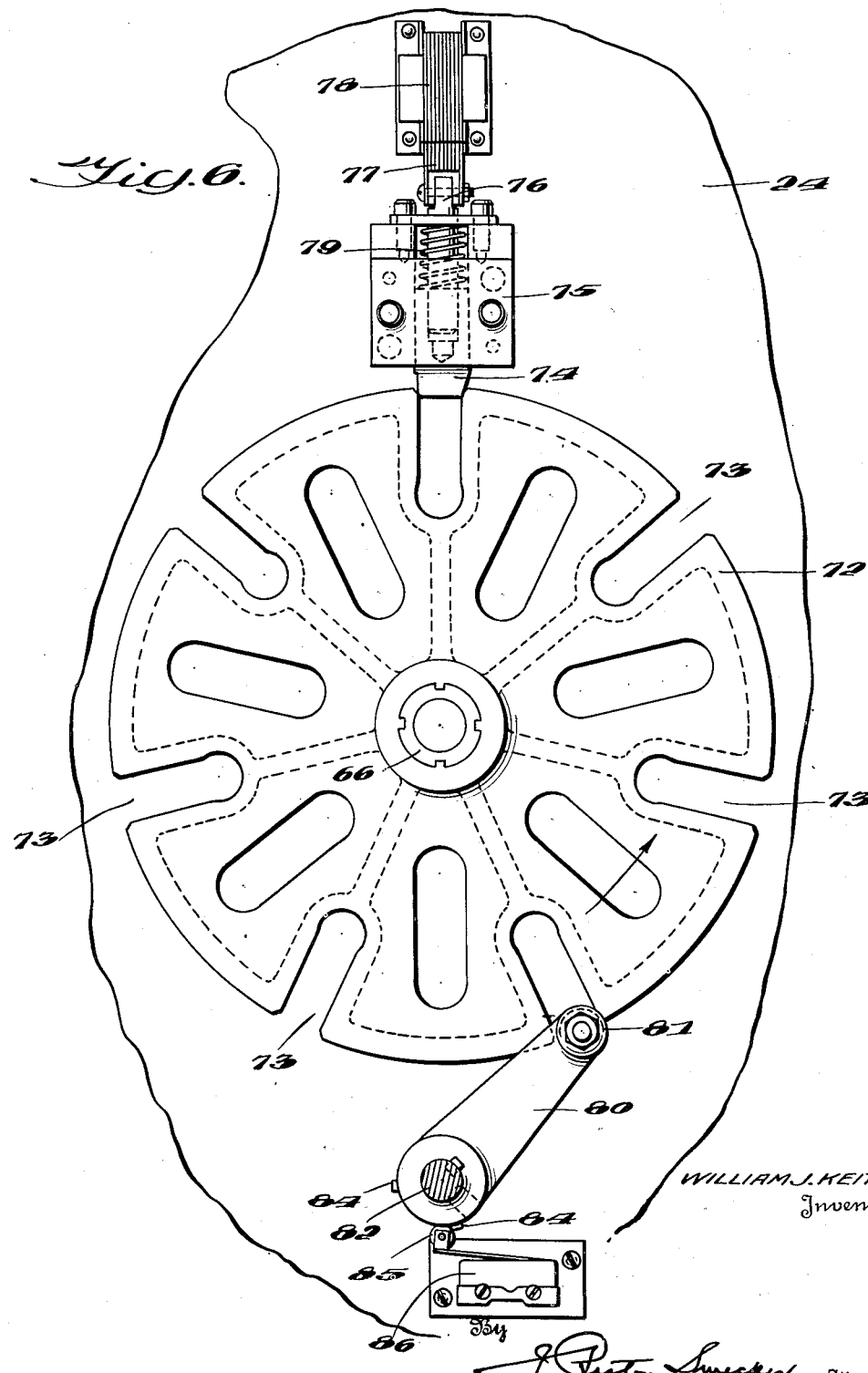

Sept. 30, 1952 W. J. KEITH 2,612,084
CAPMAKING MACHINE
Filed Oct. 25, 1946 20 Sheets-Sheet 8
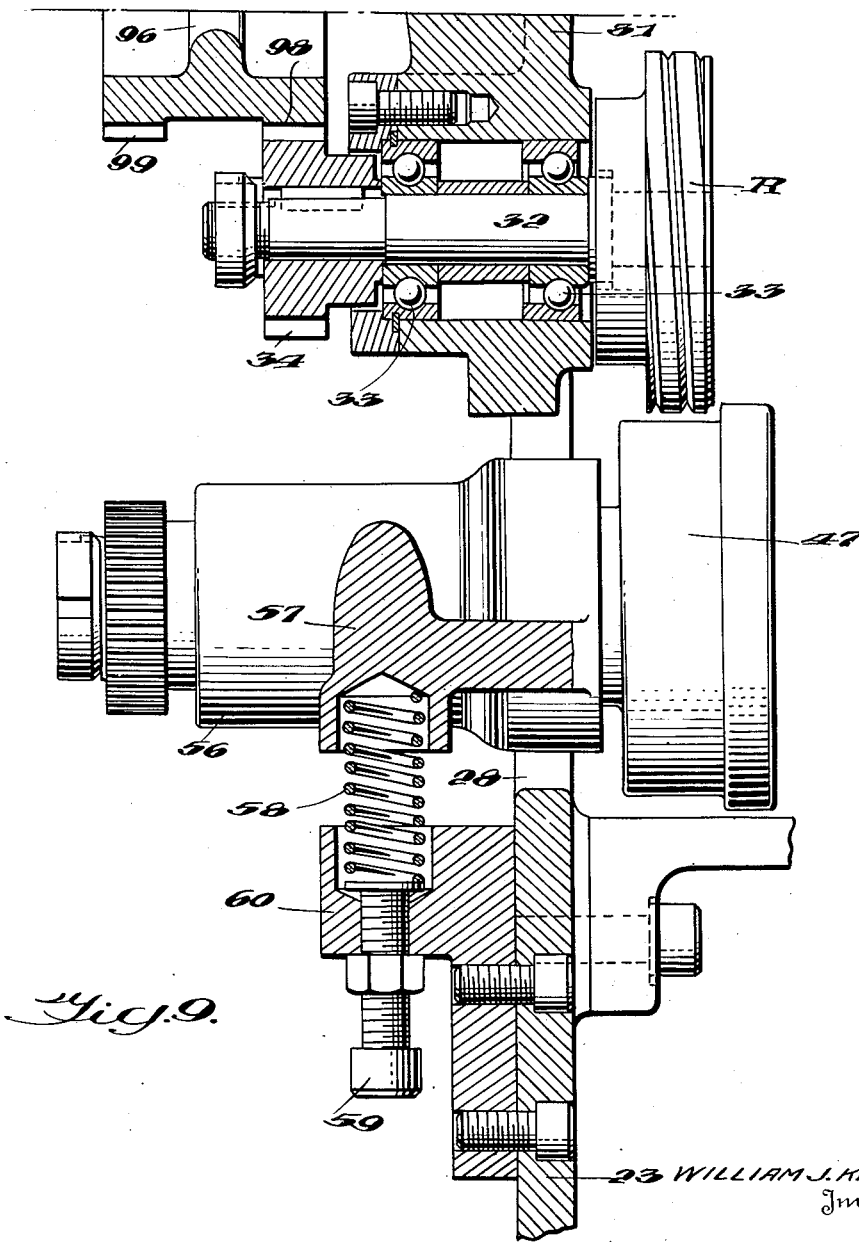
Fig. 9.
WILLIAM J. KEITH, Inventor
By ____ Attorney Sept. 30, 1952 W. J. KEITH 2,612,084
CAPMAKING MACHINE
Filed Oct. 25, 1946 20 Sheets-Sheet 9
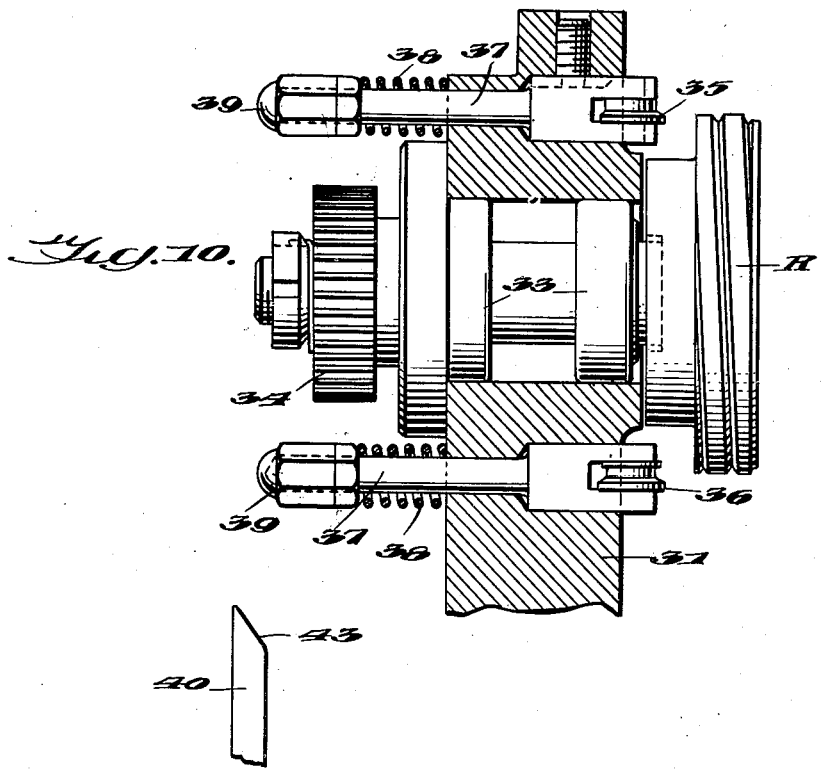
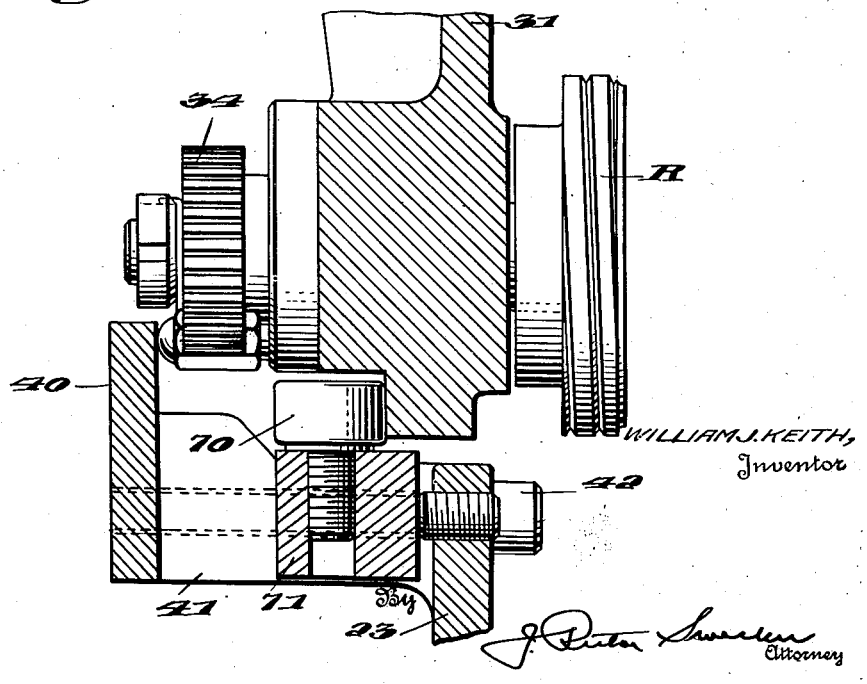
WILLIAM J. KEITH,
Inventor Sept. 30, 1952
W. J. KEITH
2,612,084
CAPMAKING MACHINE
Filed Oct. 25, 1946
20 Sheets-Sheet 10
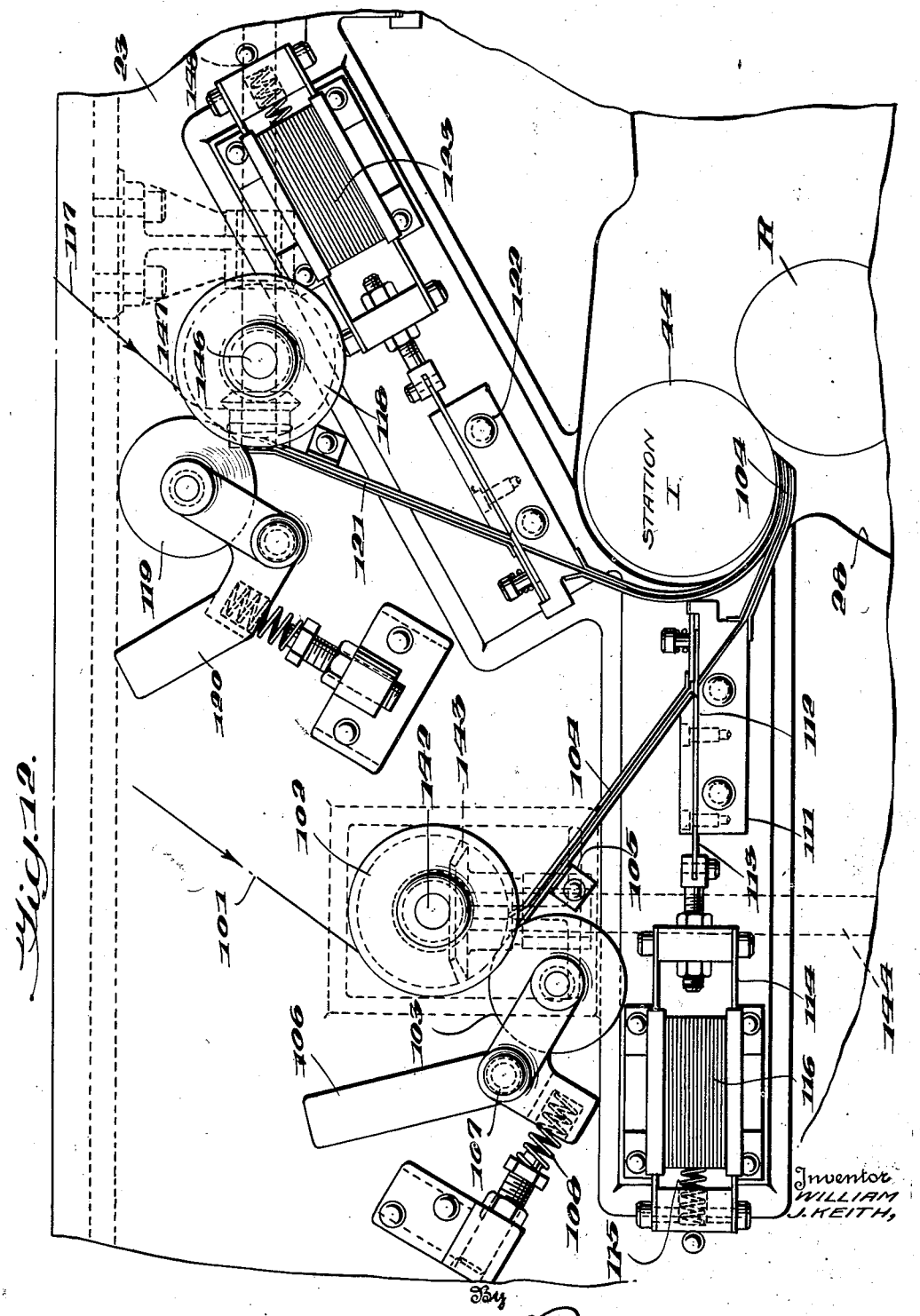

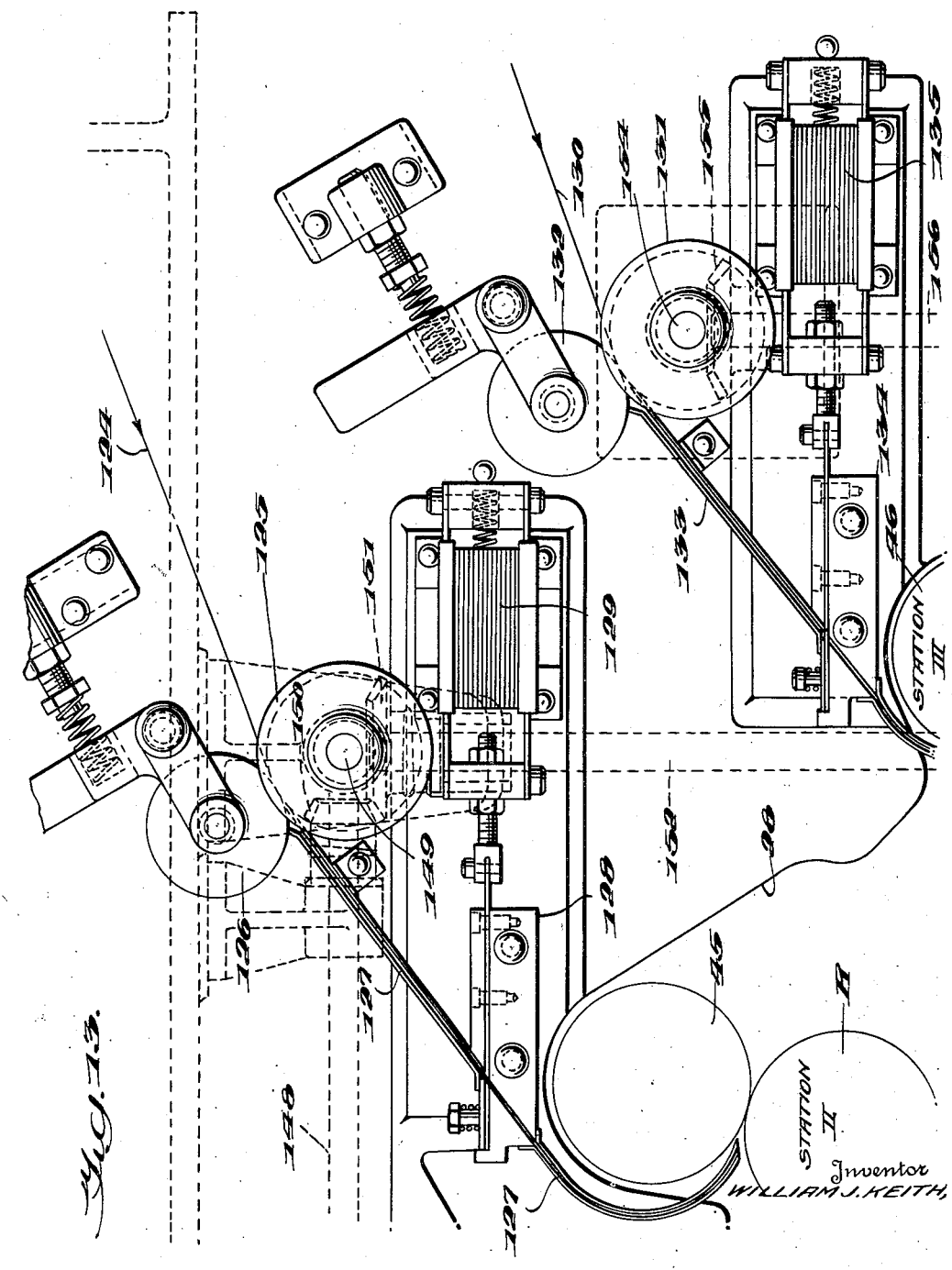

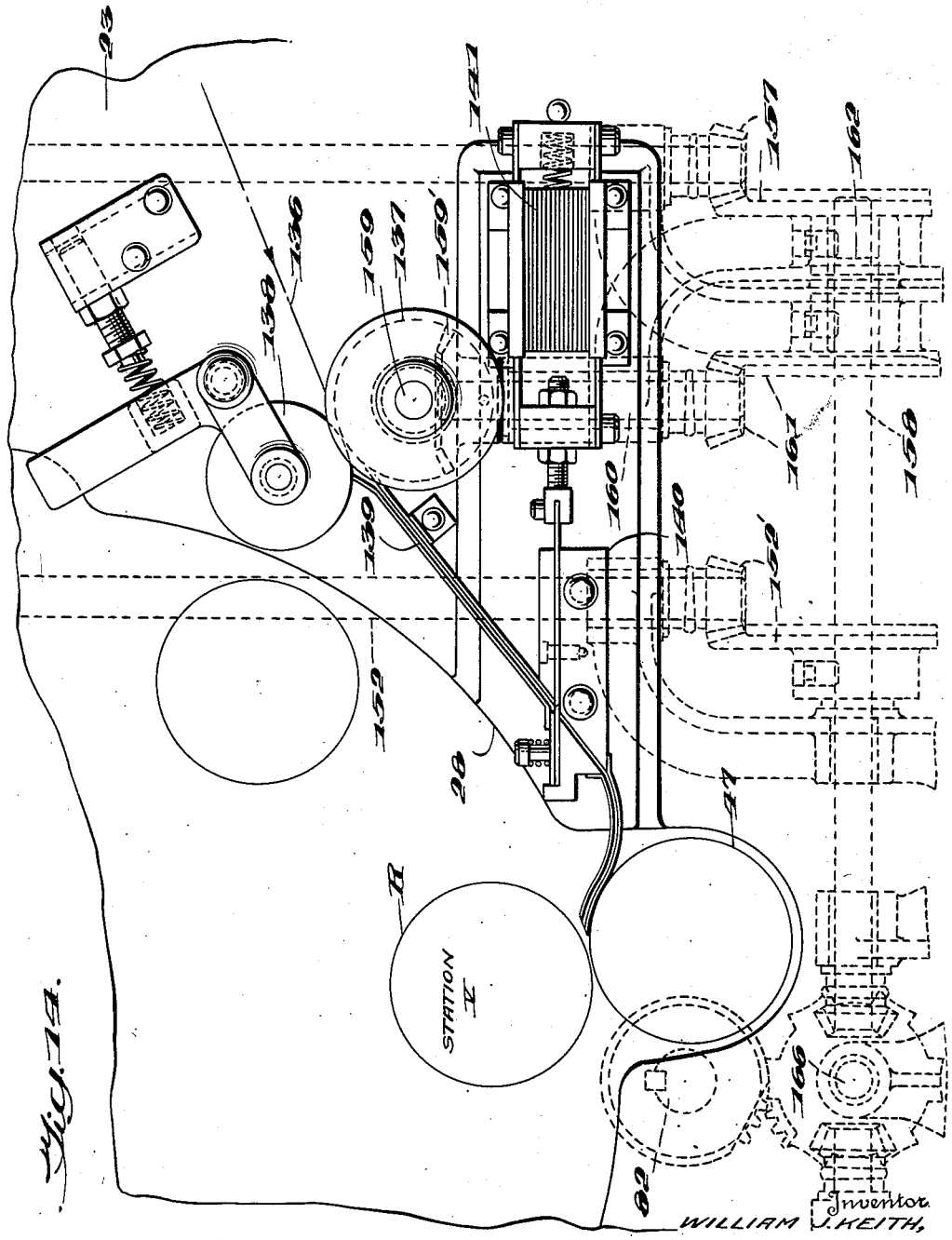

Sept. 30, 1952 W. J. KEITH 2,612,084
CAPMAKING MACHINE
Filed Oct. 25, 1946 20 Sheets-Sheet 13
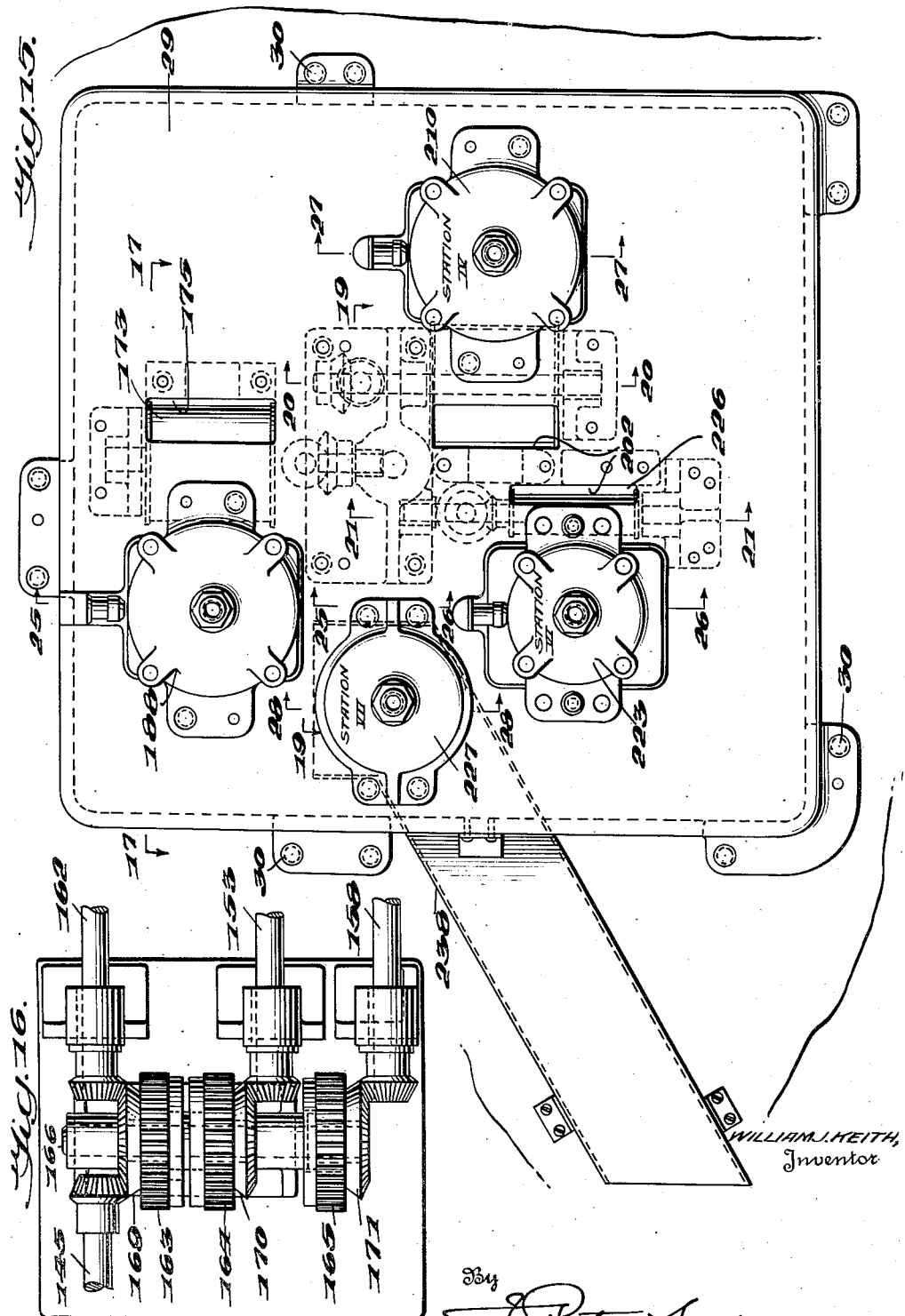
WILLIAM J. KEITH,
Inventor
Attorney Sept. 30, 1952  W. J. KEITH  2,612,084
CAPMAKING MACHINE
Filed Oct. 25, 1946  20 Sheets-Sheet 14
Fig. 16a.
Fig. 16b.
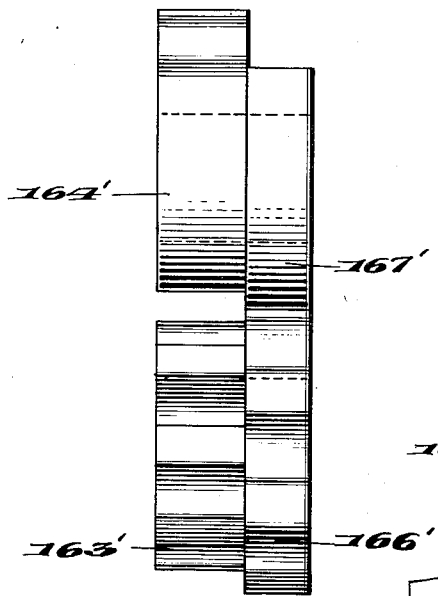
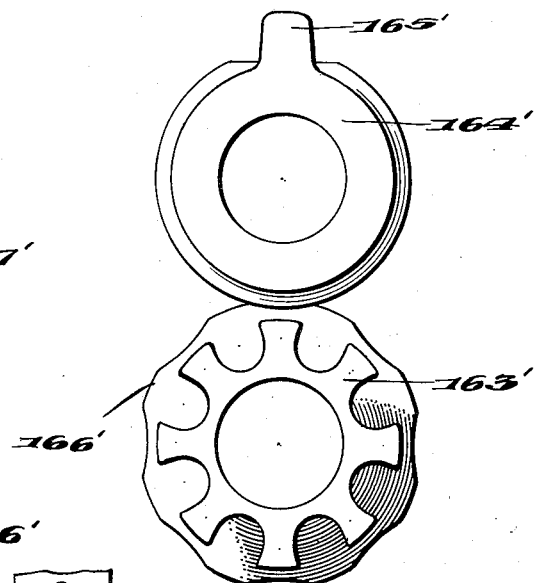
Fig. 16c.
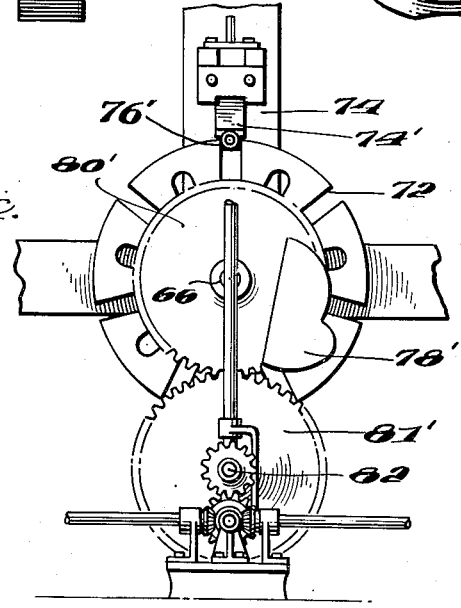
Inventor
WILLIAM J. KEITH,
By J. Preston Swecker
Attorney

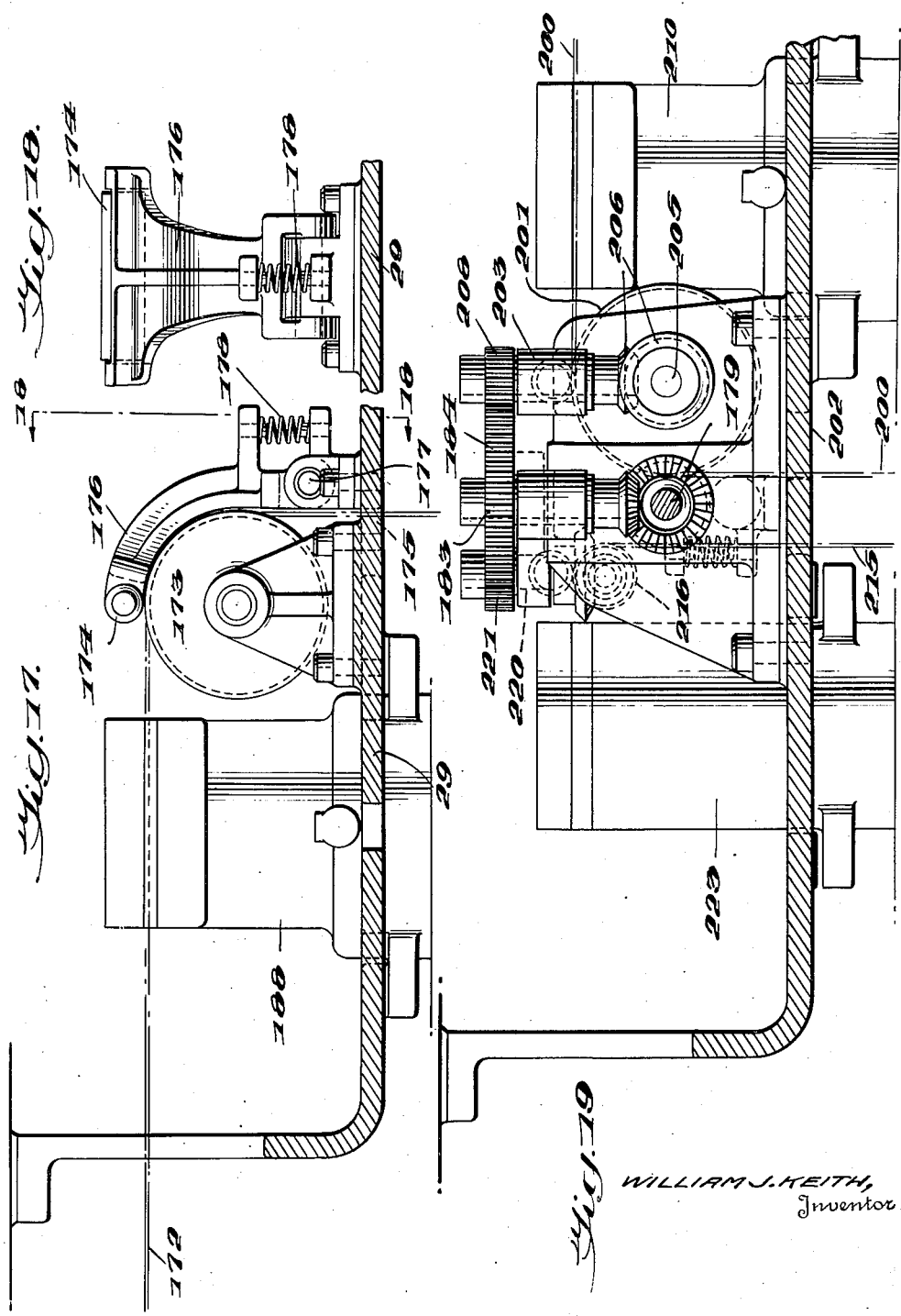

Sept. 30, 1952 W. J. KEITH 2,612,084
CAPMAKING MACHINE
Filed Oct. 25, 1946 20 Sheets-Sheet 16

WILLIAM J. KEITH,
Inventor

By J. Pinton Smecker
Attorney

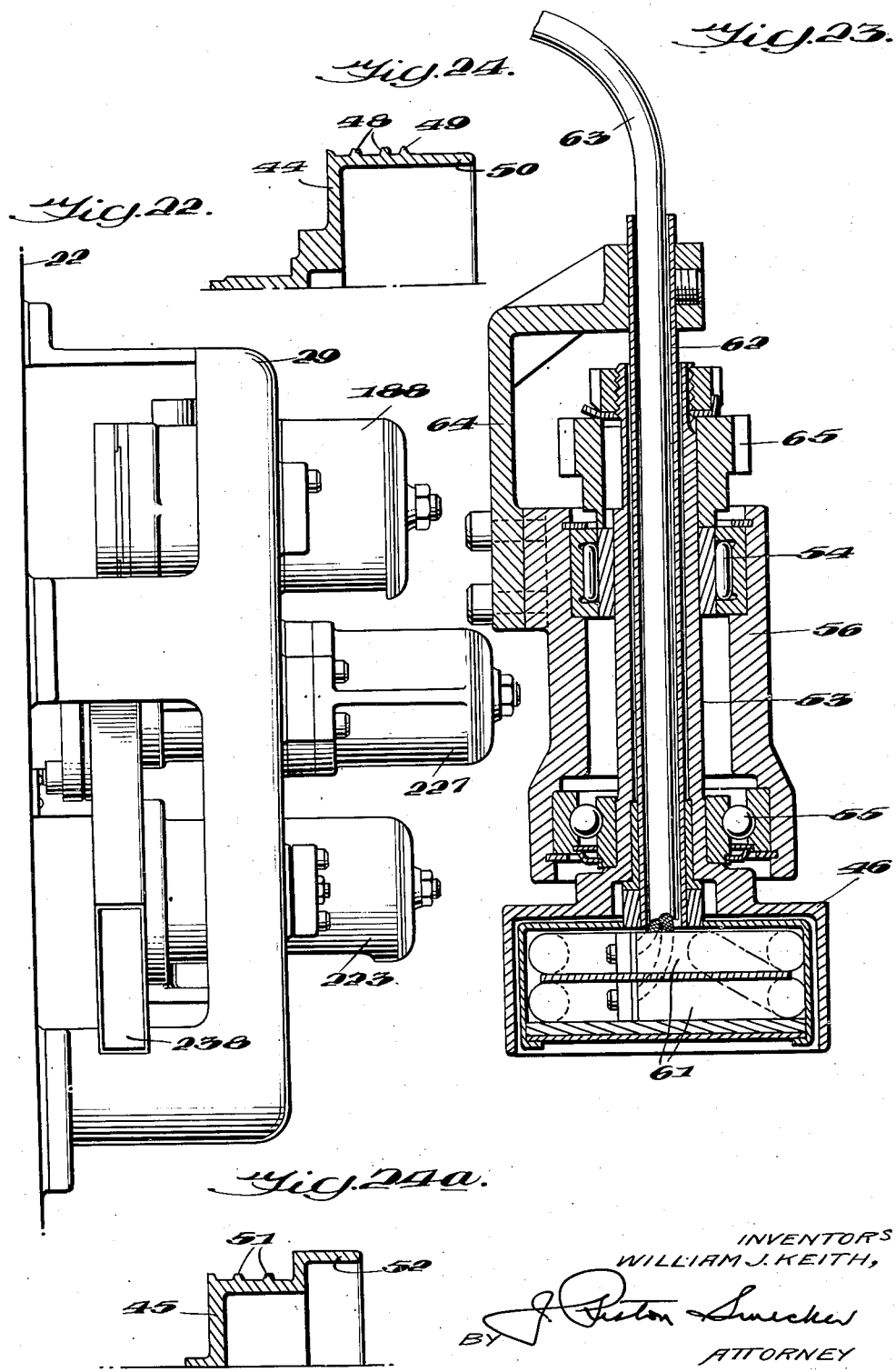

Sept. 30, 1952     W. J. KEITH     2,612,084
CAPMAKING MACHINE
Filed Oct. 25, 1946     20 Sheets-Sheet 18
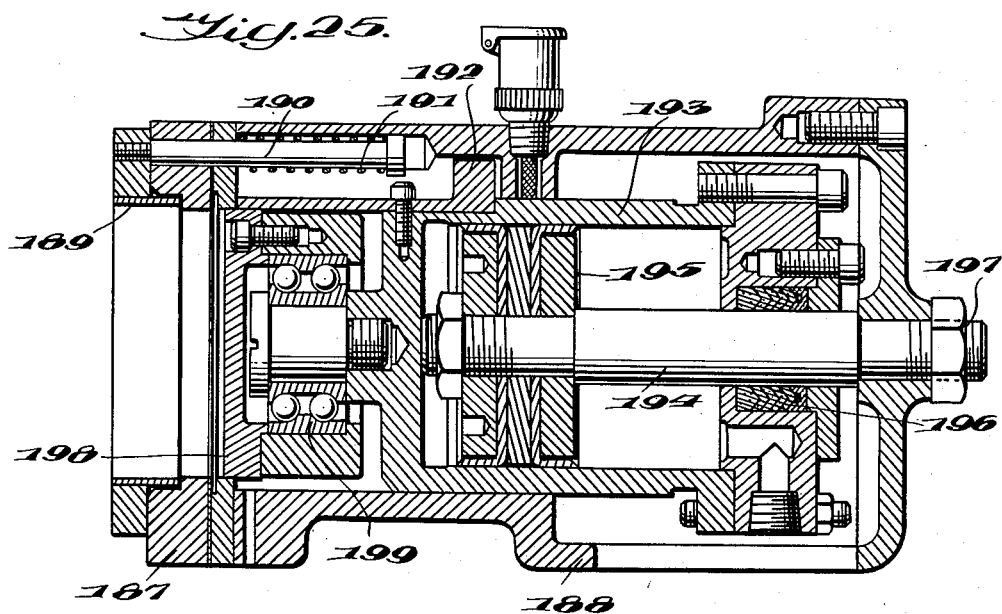
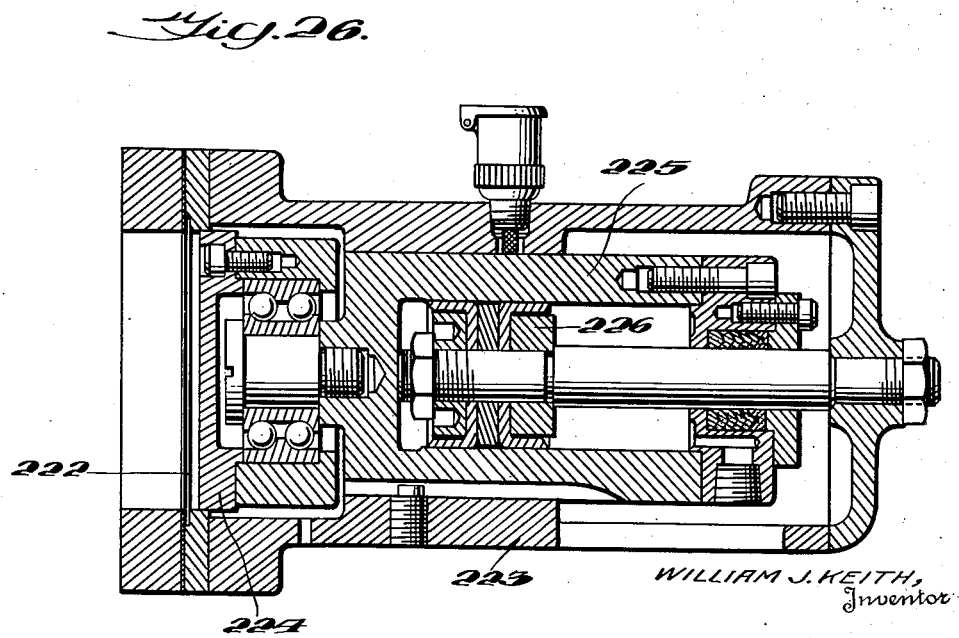
WILLIAM J. KEITH,
Inventor

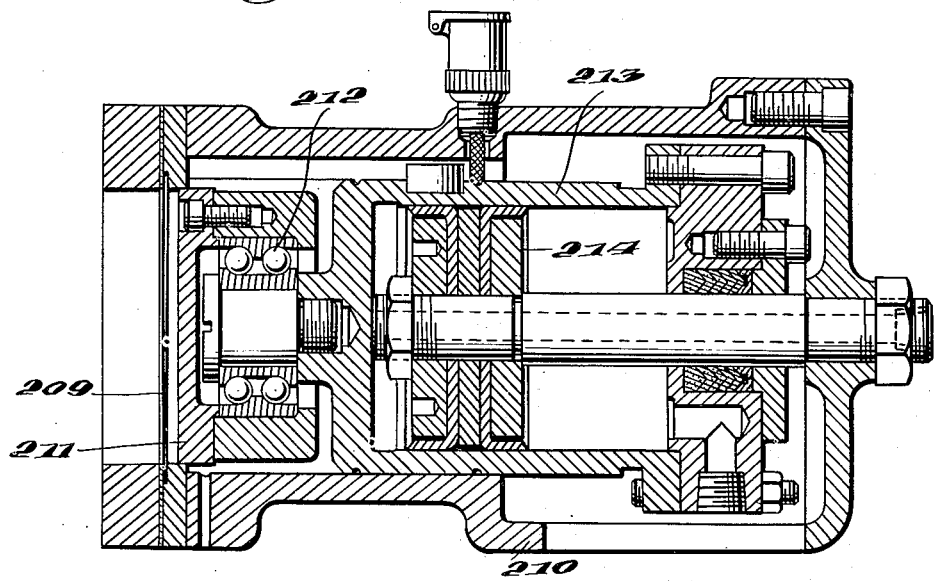
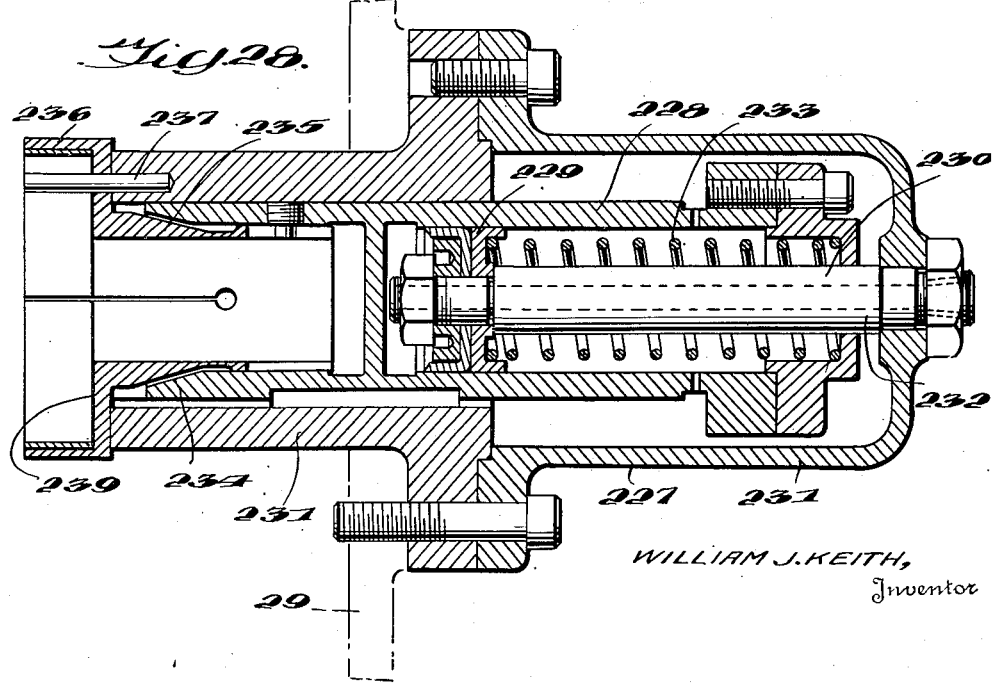

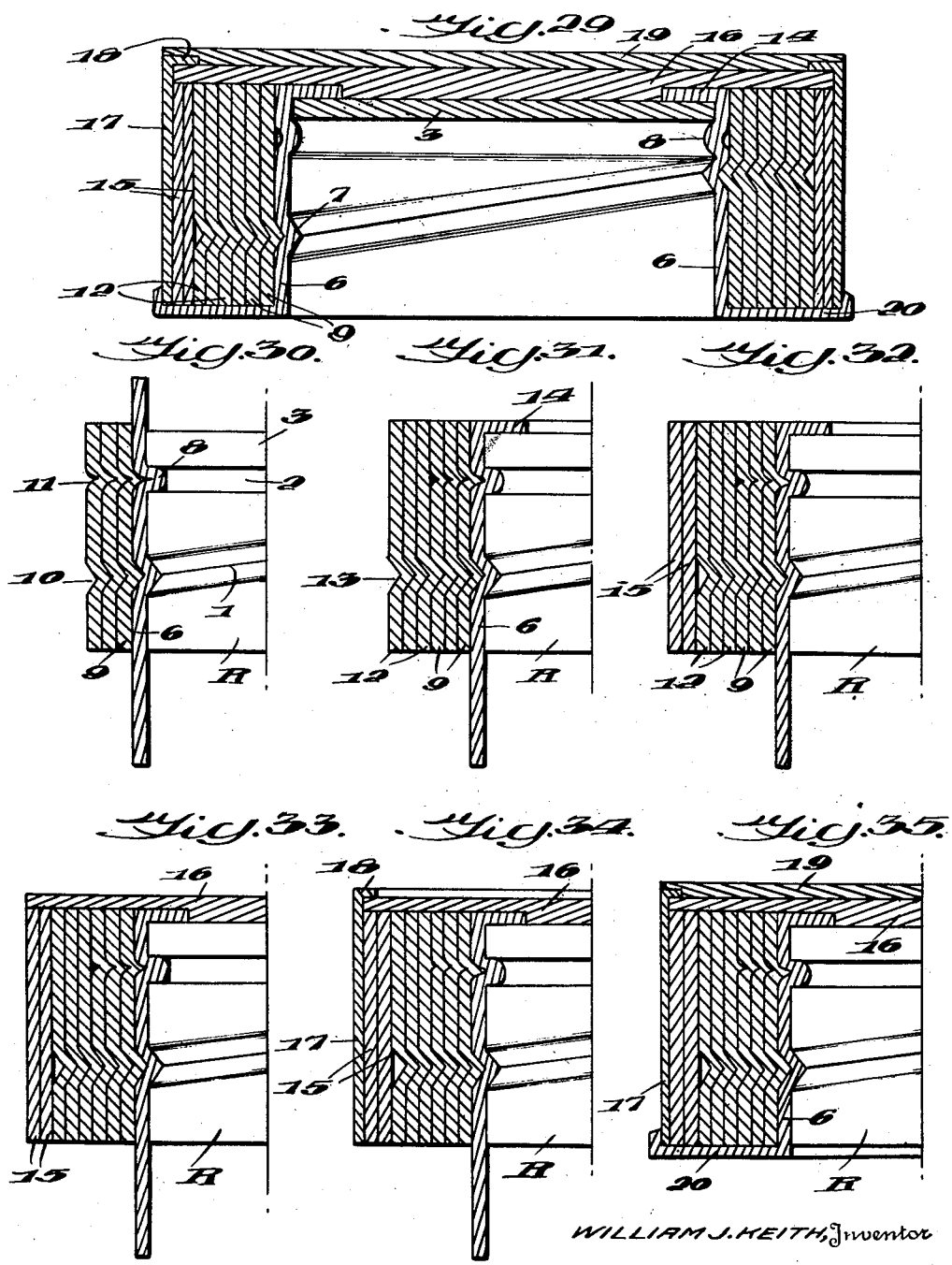

Patented Sept. 30, 1952

2,612,084

UNITED STATES PATENT OFFICE 2,612,084

CAPMAKING MACHINE

William J. Keith, Brookline, Mass., assignor to Keith-Peabody, Inc., Brookline, Mass., a corporation of Massachusetts Application October 25, 1946, Serial No. 705,616

18 Claims. (Cl. 93—1)

1

This application is a continuation-in-part of my prior application for Closure Caps, Serial No. 668,527, filed May 9, 1946, which in turn was a continuation-in-part of my application for Closures, Serial No. 453,437, filed August 3, 1942, now Patent No. 2,403,287, granted July 2, 1946.

This invention relates to improvements in cap making machines, and is adapted particularly for making closure caps of the type used for bottles, jars, and other containers adapted to be covered and sealed by a closure that is removably attached thereto as by screw threads or other fastenings interconnecting the closure cap and the container. The invention is adapted also for making other parts of containers or the like, such as powder boxes, pill receptacles, etc.

Most of the closure caps that have been used commercially heretofore have been made of tin plate, aluminum, or synthetic resins, molded or shaped to the required form. However, such materials are expensive and render the cost of the caps relatively high in price, whereby such caps are objectionable for that reason, but no other satisfactory caps have been available in the trade.

One object of this invention is to provide for the manufacture of such closure caps or other container parts from paper or other thin strips of material that may be wound readily to the required size and shape on a mandrel, not only to build a wall structure and end closure thereon, but also to form in the wall structure the fastening means for the cap which will facilitate the attachment thereof to the container in a sealing relation therebetween.

A further object of the invention is to improve the construction of a machine for winding up cylindrical bodies capable of use as closure caps, to form screw threads or other fastening means integral therewith during the shaping of the body and simultaneously with the winding of the strip or strips, whereby an integral secure fastening is provided in the body for attachment thereof to a closure in a tight sealing relation therewith.

Still another object of the invention is to provide for the automatic manufacture of closure caps in a continuous sequential manner from relatively thin strips of material, such as paper, cardboard, or other non-metallic materials suitable for the purpose, whereby closure caps may be manufactured at high speed on an automatic machine, which will provide for their production at relatively low cost.

Yet another object of the invention is to provide in an automatic cap making machine for the

2 successive step-by-step building up of multiple plies of a wall structure from one or more strips of material that are wound on a mandrel or forming roll which latter is moved through a series of stations in step-by-step fashion and has an additional forming operation provided at each of the successive stations until the completed cap is discharged from the machine. A plurality of layers of paper or cardboard or other flexible material may be applied successively at a plurality of said stations and also other elements used in forming the complete cap, such as the closure wall, the covering material, decoration and the like, all of which may be joined together adhesively in permanent secure relationship to form a closure cap that will be effective in closing and sealing a container, which has a desired ornamental appearance and may be made at such high speed on the machine as to be inexpensive for manufacture and use.

In carrying out these objects, I have discovered that it is practical to manufacture a paper closure cap by winding up one or more strips of paper, cardboard, or other thin flexible material in successive layers on a winding roll and by adhesively securing these together, they will build up a body or wall of sufficient thickness and rigidity to withstand the pressure usually required in such a closure cap. At the same time, I have found that an effective and secure fastening means may be provided for the cap to form a detachable connection thereof with the container, by impressing a thread in the successive convolutions or windings of the paper or other thin flexible strip, as it is wound on the winding roll or mandrel. By thus impressing the thread groove into each successive layer of the strip that forms the side wall of the cap, thereby pressing a thread groove of one convolution into the thread groove of the next preceding convolution or layer, a threaded fastening is provided integral with the side wall of the container which may be formed accurately for interfitting connection with the closure and to provide an effective tight sealing relation therewith, without distorting or injuring in any way the rigidity of the side wall, such as would result, if an attempt were made to press the thread groove through a plurality of plies of the side wall, which latter could not accurately form a thread or other connecting means as accurately as is possible by the method described according to this invention.

In forming the side wall of the cap, the paper strip or strips are wound successively in multiple convolutions on a winding roll or mandrel and respective strips are cut-off so as to allow the winding roll or mandrel to be moved successively through the machine to a plurality of different stations therein, where respective operations are performed step-by-step. This makes it possible for a particular portion of the machine at each station to perform only one operation on each cap, and the same operation on successive caps, whereby a plurality of caps are being formed simultaneously at different stations by partial operations thereat, whereby when one forming roll or mandrel has moved step-by-step through the successive stations, the formation of the cap is completed. This makes it possible to speed up the operation of the machine, whereby a large number of caps can be manufactured at high speed in an automatic machine, thus reducing appreciably the cost of the caps and without an unduly complicated or expensive machine.

The successive stations are provided by an index wheel mounted for movement step-by-step and adapted to be held for a sufficient length of time at each step of its movement that the respective operations may be performed at the respective stations, the entire operation being automatic, whereby the respective strips that form the side wall are wound up and cut-off to the proper length, adhesively secured together, and have the thread groove impressed therein automatically during the winding operation. Where a covering material is used thereover for ornamentation or finish, this may be provided and applied automatically at one station. In like manner, the top disc or end wall of the cap is formed by a disc of cardboard with or without additional covering and ornamentation material, which top wall is cut out and applied at one or more stations according to the number of plies thereof to be affixed to the side wall, and these are securely and permanently fastened together automatically as interconnected at the respective stations, the entire machine functioning automatically and at high speed to build secure closure caps from thin strips of paper, cardboard or the like, and without the necessity for cutting and fitting or otherwise forming sheet metal or strips thereof, to provide a portion or portions of the cap.

The handling of the strips of paper, particularly for forming the liner and end wall discs, may be facilitated appreciably by a sprocket connection between each such strip and its guiding means, whereby the strip is maintained in position and moved step-by-step through the machine while the respective discs are stamped out from the strip. This allows the unused portion of each strip to be carried out of the machine and discharged in an effective manner without becoming entangled with the operating parts of the machine nor accumulating adjacent thereto where it might interfere with the operation of the machine or access thereto.

A preferred embodiment of the invention is illustrated in the accompanying drawings in which:

Fig. 3 is a top plan view thereof;

Fig. 4 is a detail view of the top paper strip showing its feed from the machine;

Fig. 5 is a side elevation of the indexing wheel and its associated structure, but with parts omitted for clearness of illustration;

Fig. 6 is a side elevation of the indexing plate and its associated structure, but with parts omitted for clearness of illustration;

Fig. 9 is a detail cross section taken on the line 9—9 of Fig. 5;

Fig. 10 is a similar view taken on the line 10—10 of Fig. 5;

Fig. 11 is a similar view taken on the line 11—11 of Fig. 5;

Fig. 12 is a front elevation of the paper feed and cutting mechanism at station I;

Fig. 13 is a similar view at stations II and III;

Fig. 14 is a similar view at station V;

Fig. 15 is an enlarged front elevation of the punch mounting bracket of the machine;

Fig. 16 is a detail plane view of a portion of the end wall strip feed drive;

Fig. 16a is an edge elevation of a paper feed gear assembly;

Fig. 16b is a side elevation thereof;

Fig. 16c is an elevation partly in section of an indexing control unit;

Fig. 17 is a horizontal section through the paper feed mechanism on the line 17—17 of Fig. 15;

Fig. 18 is an elevation partly in section at right angles thereto on the line 18—18 of Fig. 17;

Fig. 19 is a horizontal section showing the paper feed drive on the line 19—19 of Fig. 15;

Fig. 22 is an edge view of the punch mounting bracket in elevation;

Fig. 23 is a horizontal section through one of the threaded rolls showing the heating means therefor;

Fig. 24 is a detail sectional view through another form of threaded roll;

Fig. 24a is a similar view through still another form thereof;

Fig. 25 is a cross section through the paper punch mechanism at station I, on the line 25—25 of Fig. 15;

Fig. 26 is a similar view of the paper punch mechanism at station VI, on the line 26—26 of Fig. 15;

Fig. 27 is a similar view of the punch mechanism at station IV, on the line 27—27 of Fig. 15;

Fig. 28 is a similar view of the cap ejecting mechanism at station VII, on the line 28—28 of Fig. 15;

Fig. 29 is a cross section through the formed cap; and

Figs. 30 to 35 are similar views through the cap, showing the forming operations thereof at the respective stations I to VI.

Figure 1:
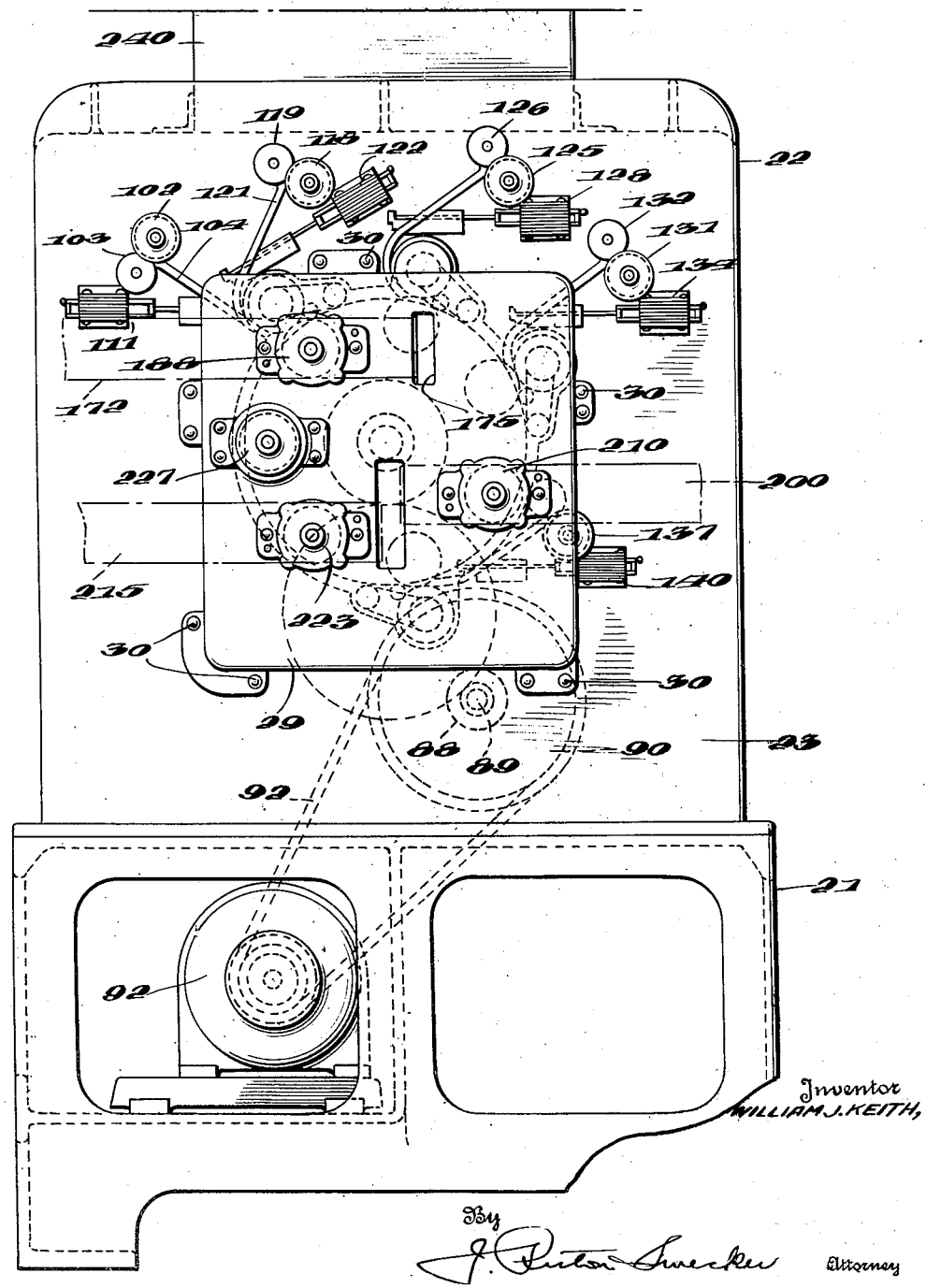
Fig. 1 is a side elevation of the complete machine.

The paper cap formed according to this invention, is set forth and claimed more in detail in my prior application for Closure Caps, filed May 9, 1946, Serial No. 668,527, substantially as shown in Figs. 29 to 35, of this application. The process of forming such a closure has been set forth also in my prior application for Closures, filed August 3, 1942, Serial No. 453,437, now Patent No. 2,403,287, granted July 2, 1946.

This process of forming the closure as set forth therein includes the steps of successively winding on a threaded roll which forms a mandrel or die, one or more strips of relatively thin flexible material, such as paper, cardboard, or the like, which strips build up the side wall of the cap or container portion, and have a top disc applied thereto and interconnected in rigid secure relationship therewith. According to the form of this invention, as illustrated, these operations are carried out at successive stations designated respectively as stations I to VII. As the paper strip or strips are applied to the threaded roll and upon preceding convolutions thereon, the side wall is formed with attaching means that will interfit with the container. This attaching means is shown as a screw thread, although the form and shape thereof may be varied as desired.

The threaded roll is generally designated at R, in Figs. 29 to 35, it being understood that one such roll will be provided for each station of the machine, whereas the number of stations provided in the machine may vary according to the respective operations to be performed in making the cap, one operation being carried out preferably at each station. Thus, in the form of the machine as illustrated, the manufacture of the cap shown in Fig. 29, involves seven operations, whereby the machine is illustrated as having seven stations designated, respectively, the last of which, station VII, is the ejecting station for the cap, but the respective views, Figs. 30 to 35, show the six operating steps in which operations are performed in manufacturing the cap illustrated in Fig. 29.

The thread roll R is cylindrical in form and is shown as provided with a spiral groove 1 in the periphery thereof, the shape of which, however, may be varied as desired so as to form a screw-thread or other means of attachment of the closure cap on the inner wall thereof. This roll R is provided also with a second groove 2 that extends circumferentially thereof for a purpose hereinafter described. The groove 2 is formed by a reduced upper end on the roll R, and the groove 2 is closed at one side only by the roll R. The other side of said groove is formed by a paper or cardboard liner disc seated on the reduced upper end of the roll R.

The enclosure embodying the present invention has its side wall constructed preferably of thin strips of flexible non-metallic material such as paper. These strips are applied successively in the form of laminations by coiling the same on the periphery of the roll R and around the liner disc 3. The thickness of the strips and size of the cap are exaggerated considerably in the drawings for clearness of illustration, it being understood that in the actual construction many laminations will be used of relatively thin paper. The number and thickness of the strips of paper and the coils or laminations may be varied, however, according to the size and character of closure cap or container portion to be formed.

In the form illustrated, the first step in forming the cap after applying the liner disc 3 to the roll R, is to apply to the periphery of the roll R, a contact lining 6, which is preferably of a single ply wound upon the periphery of the roll. This lining 6 is initially of sufficient width that the strip projects above and below the top and bottom ends of the roll, as shown in Fig. 30.

At the same time that the lining 6 is applied to the roll R, the coacting complementary forming roll, such as that set forth in the aforesaid application, impresses into the surface of the strip one or more grooves complementary with the grooves 1 and 2, thereby forming on the inner surface of the strip 6, a thread rib 7, and an inner circumferential rib 8 to embrace the periphery of the liner disc 3 and retain said disc permanently as a part of the cap.

Thereafter an additional strip, generally designated at 9, is wound in the form of a coil of the desired number of convolutions on the outside of the contact lining 6. In the form illustrated in the drawings this side wall strip 9 is in three convolutions although the number thereof may be varied as desired according to the character of cap or container portion to be formed. The complementary forming roll impresses a groove into each convolution of the side wall strip 9, as indicated at 10, simultaneously with the winding of each said convolution or layer upon the contact lining 6 and preceding layers. Thus the paper or other material forming the wall unit 9 will reinforce the thread rib 7 by being forced therein and in succeeding backing convolutions as these are formed and simultaneously with the winding of the laminations on the roll. This not only embosses a thread on the inner surface of the closure, but this thread is backed up and reinforced by similar ribs embossed in the succeeding laminations applied thereover.

As set forth in the aforesaid application, the succeeding laminations or layers may be secured together adhesively, if desired, to increase the permanence and rigidity of the structure. Any suitable adhesive material may be used as desired, but it is preferred that a synthetic thermo-plastic resin be employed for the purpose. Under some conditions, a thermo-setting resin may be used if desired.

Simultaneously with the forming of the spiral thread rib at the inner surface of the wall structure and on the contact lining 6, the rib 8 is formed also at the inner surface thereof, but in the form shown this rib extends circumferentially of the cap. The coacting forming roll that is complementary to the roll R is also constructed to tuck the paper material 9 into the initially embossed rib portions 8, as indicated at 11, so as to reinforce this rib 8 in the manner indicated in the drawings.

Additional laminations may be applied thereover, as indicated at 12 in Fig. 31, to build up the wall structure to the desired thickness. These additional wall laminations are embossed at 13 complementarily with the thread rib in the manner described so as to continue to reinforce this rib portion of the cap.

Successively or simultaneously with the application of these additional laminations to the structure, the upper edge of the contact lining may be turned over at 14 onto the top surface of the liner disc 3, as shown in Fig. 31. This securely embraces the periphery of the liner disc by the wall structure of the cap.

Thereafter additional side wall laminations are applied as shown at 15 in Fig. 32. These laminations are not embossed but cover the embossed thread portion of the wall structure.

The next step is to apply the top disc 16 which extends over the upper face of the roll R and over the upper edge portion of the closure formed thereon. This top disc 16 is formed preferably of cardboard or other suitable material and may be pressed into place so as to cover the flange 14 and upper edge of the wall structure and to fit snugly thereto. The disc 16 is coated with adhesive on the under surface thereof when applied, which binds the discs 3 and 16 firmly together with the flange 14 locked therebetween. This provides secure resistance to the lip thrust of the bottle or jar, providing a perfect sealing of the container.

Where a side wall decoration is desired this may be applied over the wall structure 9—15, as indicated at 17 in Fig. 34. The upper edge of the decorating strip 17 is preferably turned in over the periphery of the top disc 16, as shown at 18. An additional top decoration may be applied thereover as indicated at 19 in Fig. 35. The lower projecting edge of the contact lining 6 is then turned outward about the lower edge of the wall structure, as indicated at 20 in Fig. 35. This completes the formation of the cap as a whole.

It will be evident that these successive layers of paper or other flexible material that form the wall of the cap are secured together in any suitable manner, as by an adhesive of the character described, and coact to form a sturdy and rigid closure cap.

After the completion of the forming operation, the cap may be unscrewed readily from the roll R by relative rotation therebetween. The cap is initially retained on the roll R only by the thread rib 7, so that it may be separated readily by unscrewing.

This closure may be made entirely of paper or other thin flexible material and is capable of manufacture on very simple machinery and at low cost. At the same time it forms not only an effective closure but one that may be secured rigidly to a container, as by a screw-thread or other fastening formed integral with the inner wall of the closure. At the same time, the closure cap is superior in use to more expensive structures used heretofore.

Figure 2:
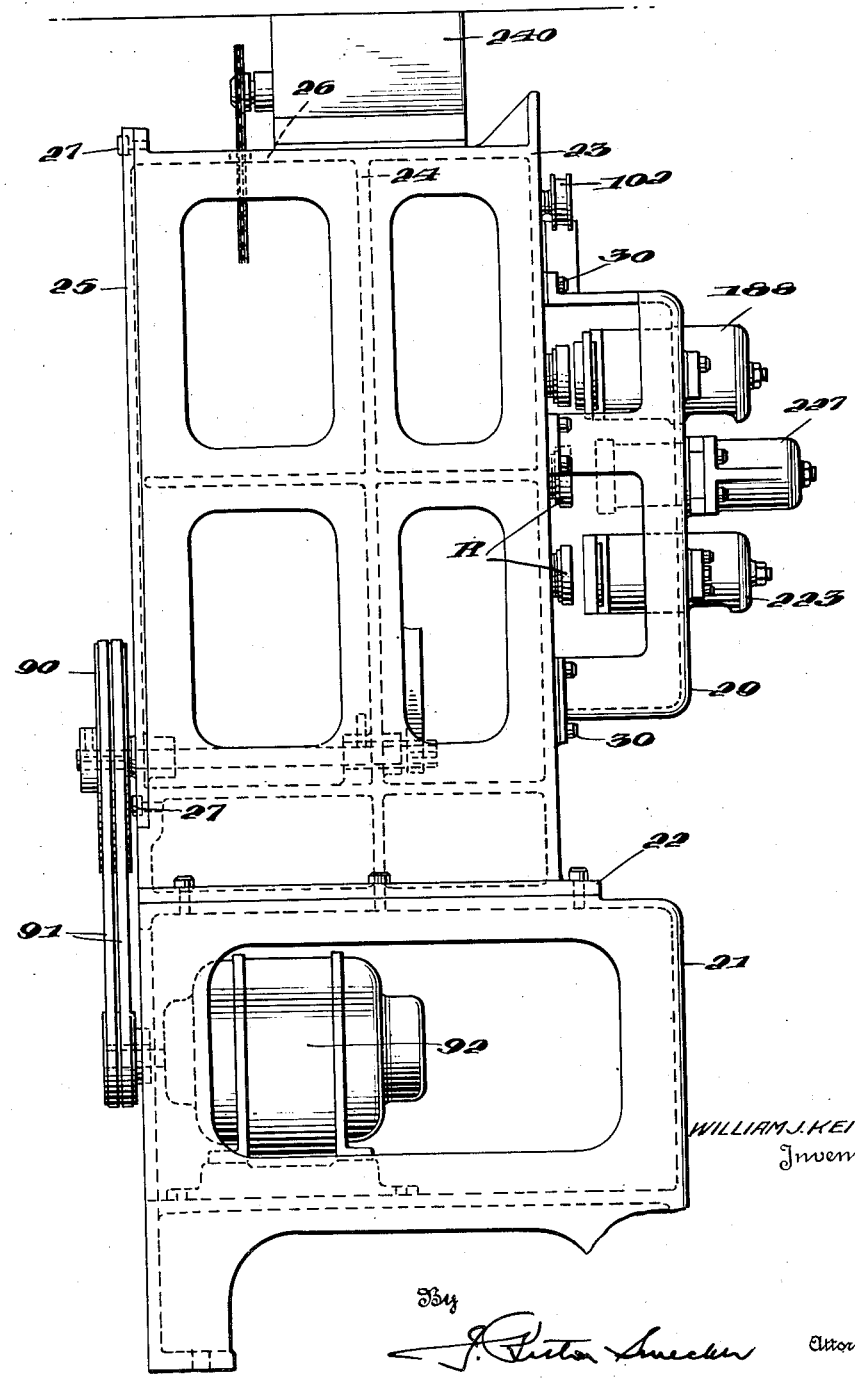
Fig. 2 is an end elevation thereof.

In the form of machine shown in Figs. 1 to 28, the operating mechanism is carried by a base generally designated at 21 in Figs. 1 and 2, and which is adapted to be supported on the floor or on a suitable foundation as a rigid mounting for the machine. The base is shown in the form of a casting, although the shape and size thereof may be varied as desired.

Figure 7:
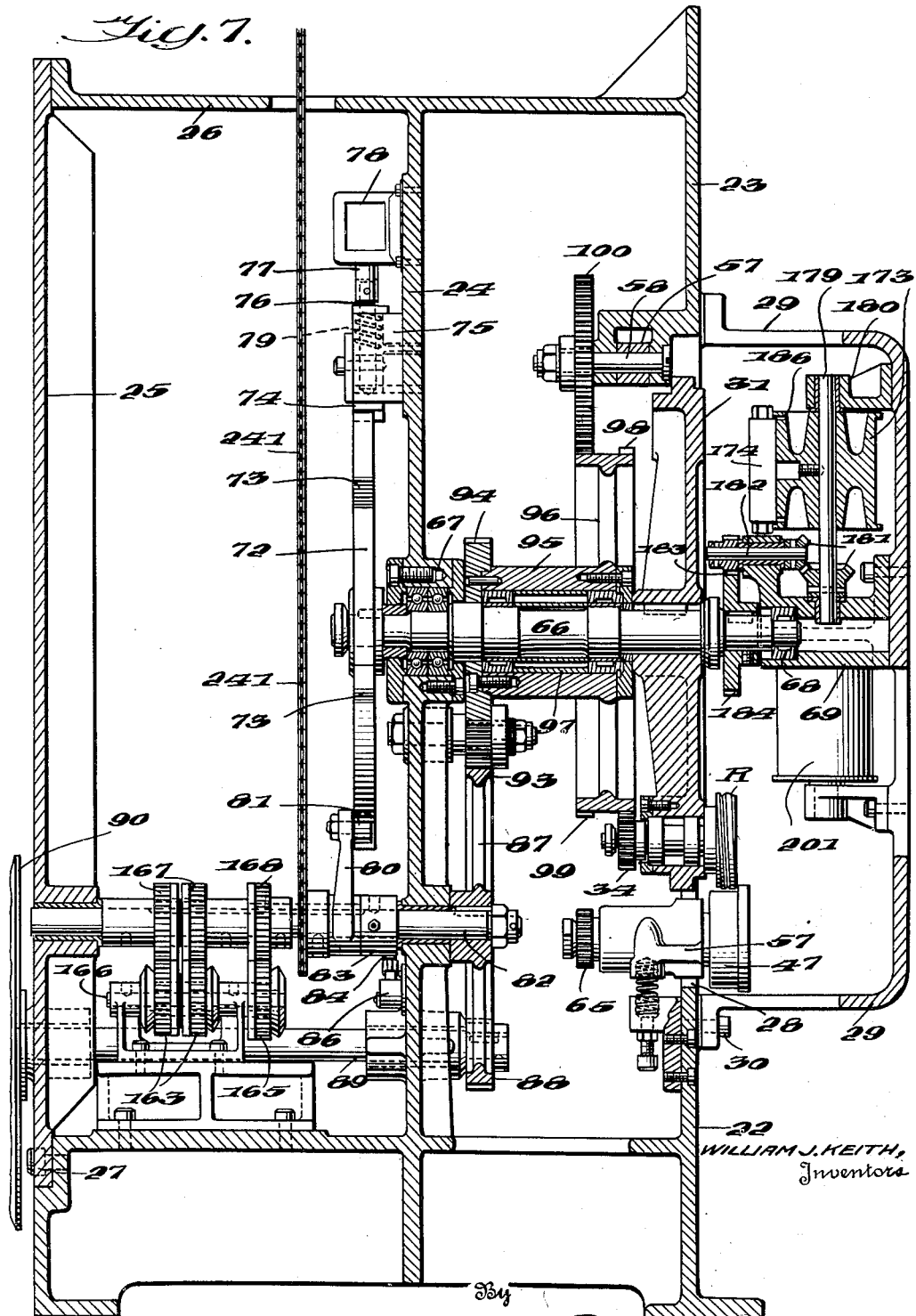
Fig. 7 is a vertical cross section through the machine.
Figure 8:
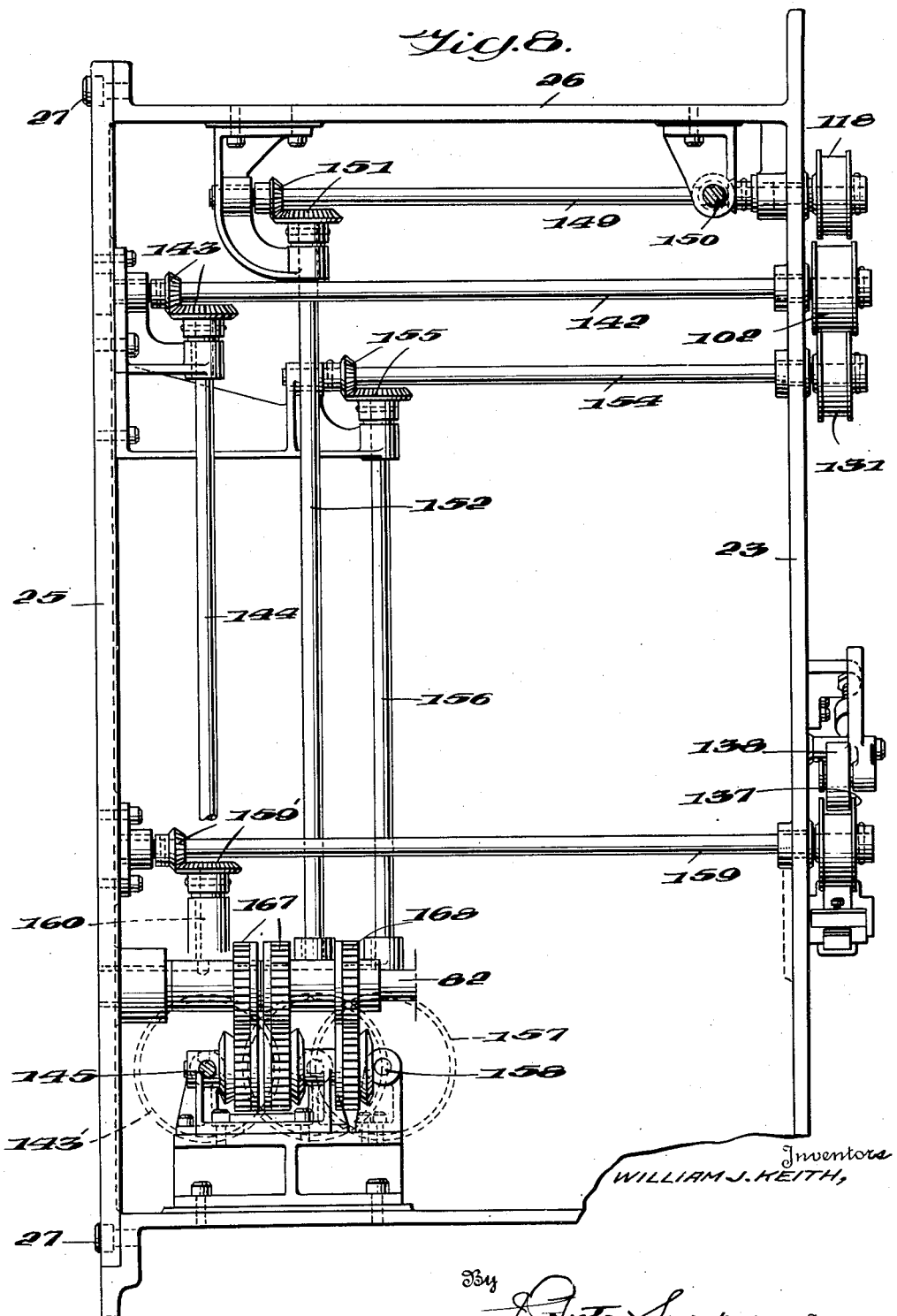
Fig. 8 is a similar view showing the driving connections, with parts omitted for purpose of illustration.

Surmounted upon the base 21 is a housing 22, the structure of which is shown more in detail in Fig. 7. The housing 22 includes a front plate 23, an intermediate partition 24, and a back plate 25, as well as a top 26. The back plate 25 is detachably mounted on the remainder of the housing to facilitate the insertion and mounting of the operating parts, as hereinafter described. Screw fastenings 27 are shown as a means of securing the back plate 25 to the remainder of the housing 22, as illustrated in Figs. 7 and 8.

The front plate 23 has an opening 28 therein to receive the indexing mechanism (see Figs. 5, 7, 12). This opening 28 is surrounded and covered by a cover plate 29 which encloses a portion of the operating mechanism. The cover plate 29 is detachably mounted on the front plate 23 by means of screw bolts 30.

*Indexing mechanism*

As described above, the machine utilizes a plurality of stations, seven of which are shown for building the paper cap of the structure illustrated in Fig. 29, although the number of stations may vary somewhat as desired, according to the structure to be made. It is preferable to use one station for each operation, to facilitate the manufacture of the cap and to make caps at high speed on the machine. The stations are indicated by successive numbers in Fig. 5 and are formed at respective points on an indexing wheel 31, where a threaded roll R is mounted on the indexing wheel 31. This roll R is the roll designated in Figs. 30 to 35, as described above, and a similar roll R is used at each of the stations I—VII, and is externally screw-threaded as described.

Each threaded roll R is mounted on a shaft 32 (see Figs. 9 to 11) journaled in bearings 33 mounted in the peripheral portion of the indexing wheel 31 to be rotated freely relative thereto. A pinion 34 is fixed to the shaft 32 for rotating the threaded roll R, as hereinafter described.

Provision may be made at station VI for turning over the finishing edge portion 20 (Fig. 35). This may be accomplished by any suitable means, but, in the form illustrated in Fig. 10, each of the threaded rolls R has mounted on opposite sides thereof, respective roll-out and finish wheels 35 and 36 for the purpose described.

Each of the wheels 35 and 36 is journaled on one end of a plunger 37, slidably mounted in the indexing wheel 31. A coiled spring 38 surrounds the plunger 37 and is interposed between one side of a shoe 39 and the adjacent side of the wheel 31. The shoe 39 is in position to be engaged by a cam plate 40 carried by a bracket 41 fixed to the inner face of the front plate 23 of the housing adjacent station VI, as shown in Figs. 5 and 11. The bracket 41 is secured in place by machine screws 42. The cam plate 41 has a beveled edge 43, as shown in Fig. 10, in position to engage the shoes 39 when these are adapted to be actuated for projecting the wheels 35 and 36, into engagement with the edge portion of the paper of the cap at station VI.

Cooperating with each of the threaded rolls R at stations I, II, III and V, is a roll, designated respectively at 44, 45, 46 and 47. The rolls 44 and 45 at stations I and II are externally screw-threaded complementary to the thread groove 1 in the roll R and also provided with a continuous ring perpendicular to the axis of the roll, complementary to the groove 2 in the roll R to press the paper strips into these respective grooves, as indicated at 10, 13, 8 and 11, in Figs. 30 and 31, as described above.

The external screw thread of the roll 44 is indicated at 48, in Fig. 24, while the circumferential rib thereon is shown at 49. The roll 44 is formed with a skirt 50 of uniform diameter with the threaded portion thereof, as shown.

The threaded roll 45 is shown in Fig. 24a, as having an external screw thread 51, but does not have any rib corresponding with the rib 49, because the strip 12 in Fig. 31, is not necessarily pressed into the groove 11 of the preceding plies of the cap side wall, in the form illustrated. However, the roll 45 has a circumferential enlargement 52 on the skirt thereof, of greater diameter than the threaded portion of the roll for the purpose of engaging and turning over the flange 14, in Fig. 31, on the lining strip 6 when the roll R is presented to station II.

Since a thread is pressed into the side wall strips only at stations I and II, the rolls 44 and 45 are the only rolls provided with external screw threads. The roll 46 at station III is illustrated in Fig. 23, and has a plain exterior, cylindrical in form and of uniform diameter. However, the roll 47 at station V, while also plain and unthreaded, has an enlarged skirt similar to the skirt 52 on the roll 45 (Fig. 24a) for turning over the edge 18 of the strip 17, as indicated in Fig. 34.

Each of the rolls 44–47 is formed with a tubular shaft portion 53 journaled in bearings 54 and 55 (Fig. 23), in a bearing portion 56 at one end of an arm 57.

The opposite end of the arm 57 is pivotally mounted at 58 (see Fig. 5) on the front plate 23 of the housing. The rolls 44–47 normally are pressed inward into peripheral bearing engagement with the rolls R at the corresponding stations by a coiled spring 58, bearing against each arm 57 intermediate its ends, as shown in Figs. 5 and 9. The spring 58 may be adjusted in tension by a screw 59, between which and the arm 57, the spring is interposed, which screw 59 is mounted in a bracket 60 projecting inwardly from the front plate 23 of the housing.

Inasmuch as it is preferred to use paper strips for the cap structure that are coated with a thermo-plastic adhesive, such as synthetic resin, provision is made for heating the strips as these are wound on the roll R, for successively fixing the respective layers thereof adhesively together. Any suitable heating means may be provided in each of the rolls 44–47. In the form illustrated, each roll is provided with an electric heating element or coil 61, which may be bare wire, enclosed in the roll, as indicated in Fig. 23. This electric heating unit is supported free of the roll to allow turning movement of the latter relative thereto, by a sleeve 62, through which the electric wires 63 may extend for supplying electric current to the coil. The sleeve 62 is mounted on a bracket 64 secured to the journal portion 56 of the arm 57. The coil may be fixed to the roll, if desired, supported on an insulated mounting therein, in which event brush contacts should be provided for electrical connection therewith.

Each of the rolls 44–47 is adapted to be turned in timed relation with the corresponding roll R, when presented thereto, and therefore, the tubular shaft 53 has a pinion 65 fixed on the outer end thereof in position to be engaged by a driving gear for rotating the roll.

*Index control mechanism*

Referring to Fig. 7, the indexing wheel 31 is fixed on a shaft 66 at one end thereof, and located in the opening 28 in the front plate 23 of the housing 22. The shaft 66 is journaled at one end in bearings 67 in the partition 24 of the housing and at its opposite end in a bearing 68 in a bracket 69 secured to the inside face of the cover 29.

The indexing wheel 31 is supported on the shaft 66, but it is also guided axially by a series of rollers 70 spaced circumferentially around the periphery of the indexing wheel 31, as shown in Fig. 5, and mounted on brackets 71 secured by the screws 42 to the front plate 23 of the housing, as shown in Fig. 11.

At its rear end, the shaft 66 projects through the partition 24 and carries on the rear end thereof, an indexing plate 72 (see Figs. 6 and 7). The plate 72 is provided with a series of peripheral notches 73 therein, one for each station of the machine, and arranged preferably in axial alignment with the rolls R, so as to position the rolls at the respective stations. The indexing plate 72 turns the indexing wheel 31 and also serves to hold the wheel in its set position during the respective operations at the stations thereof.

As shown in Fig. 6, a latch 74 is in position to engage in one of the notches 73 at the top of the plate 72 to hold the plate and the indexing wheel against rotation during the performing of an operation at each of the stations. The latch 74 is slidably mounted in a housing 75 into which extends a rod 76 connected with the core 77 of a solenoid 78. The solenoid 78 is mounted on the partition 24 of the housing. A coiled spring 79 acts on the latch 74 normally tending to press the latch against the periphery of the plate 72 and into one of the notches 73, except when the latch is withdrawn upon energizing of the solenoid 78.

At the lower side in the form shown, the indexing plate 72 is provided with operating means in the form of a lever 80, having a roller 81 on the upper end thereof in position to enter the respective notches 73 upon swinging movement of the lever 80 and thereby cause a step-by-step movement of the indexing plate 72. The lever 80 is fixed on an indexing shaft 82 that extends transversely of the lower portion of the housing 22 and is journaled at its opposite ends in the plates 24 and 25 as shown in Fig. 7.

Fixed on the shaft 82 beside the lever 80 is a collar 83 which carries radially projecting pins 84 at points thereon spaced circumferentially in position to engage a contact roller 85 of a limit switch 86 (see Fig. 6). The switch 86 is of the type that is closed on one actuation of the arm thereof and remains closed until said arm is actuated again. The limit switch 86 is electrically connected with the solenoid 78, whereby when one of the pins 84 engages the roller 85, the solenoid will be energized to attract its core and thereby withdraw the latch 74 from holding engagement with the plate 72. Then when the other of the pins 84 is moved into engagement with the roller 85 of the limit switch 86, the solenoid 78 is deenergized, allowing the spring 79 to force the latch into engagement with the next notch 73, thus holding the indexing plate 72, and consequently the indexing wheel 31, in its set position for performing the next operation at each of the respective stations.

If desired, the electro-magnetic latch may be replaced with a latch control of the character shown in Fig. 16c, in which the latch 74' has a follower 76' in position to be engaged by a cam 78'. The cam 78' is mounted on a gear 80', journaled loosely on the shaft 66. The gear 80' meshes with a gear 81' fixed on the shaft 82 to be driven thereby. Therefore, the rotation of the shaft 82 will turn the gears 80'—81' and lift the latch 74' once for each revolution of the gear 80', to allow step-by-step movement of the latching plate 72, as described above. This will accomplish positive raising of the latch without resort to electro-magnetic means for the purpose, if desired.

The indexing shaft 82 is power-driven continuously, by means of a gear 87 fixed on the shaft 82. The gear 87 meshes with a pinion 88 mounted on a drive shaft 89 extending through the lower portion of the housing to a point externally thereof, where the drive shaft 89 carries a pulley 90 (Fig. 7). As shown in Figs. 1 and 2, the pulley 90 is driven by belts 91 from the armature shaft of an electric motor 92 mounted in the base 1. Thus the operating speed of the motor is stepped down before it is applied to the indexing shaft 82.

As shown in Fig. 7, the gear 87 also meshes with a pinion 93 which serves as an idler pinion to drive a gear 94 that is pinned to one end of a hub 95 on a main gear wheel 96. The hub 95 is journaled at 97 about the shaft 66 free thereof, for relative turning movement and normally turns in the opposite direction from the shaft 66.

The gear wheel 96 has two gears 98 and 99 thereon, axially spaced as shown in Fig. 7. The gear 98 is in mesh with the pinions 34 of the rolls R, as shown in Fig. 9, so as to rotate all of the rolls R continuously during turning movement of the gear wheel 96.

The gear 99 is in mesh with an idler gear 100 located at each of stations I, II, III and V, as indicated in Fig. 5. The idler gears 100 transmit movement to the pinions 65 at each of said stations, with which they mesh, whereby to rotate the rolls 44–47 in the opposite direction to the coacting rolls R, in bearing relation therewith. The movement of the rolls R to the respective stations is properly timed for coacting relation with the cooperating roll to register with the formed thread groove. The idler gears 100 are mounted on the pins 58 which form the pivotal supports for the roll arms 57, as shown in Figs. 5 and 7.

*Paper feed mechanism*

Provision is made for feeding continuous strips of paper to each of stations I, II, III and V, as shown in Figs. 12 to 14, for winding on the threaded roll R, and on preceding plies thereon, to form the side wall of the cap. This feeding action is synchronized with the operation of the rolls, so that only the proper quantity of paper is supplied which is then severed from the strip and is wound up to form a stationary rigid side wall structure having the characteristics described.

Referring to Fig. 12, there is shown mechanism for feeding two separate strips of paper to the threaded roll R, one of which forms the liner 6 of the cap while the other is in three turns, as indicated at 9 in Fig. 30.

The continuous strip of paper designated at 101, forming the liner 6, passes between a power driven feed roll 102 and a coacting idler roll 103, thence into a feed trough 104. This trough 104 is secured by brackets 105 to the face plate 23 of the housing externally thereof.

The idler roll 103 is carried on one arm of a lever 106 pivotally mounted at 107 on the face plate 23 and spring-pressed at 108, so as to hold the roll 103 yieldably against the feed roll 102.

The liner strip 101 of paper is fed through the trough 104 to the bite between the rolls R and 44, where it will be caught by the rolls and drawn therebetween. This liner strip is not adhesively covered, according to this form of the invention, although it may be coated if desired.

Any tendency for the strip to follow around the thread roll 44 may be prevented by the mounting of a paper pickoff wheel 109 on the arm 57 at station I, as shown in Fig. 5. This wheel 109 is journaled on a pin 110 and has a beveled edge in peripheral bearing relation with the smooth skirt of the roll 44, and is free to turn therewith on its pin 110, so as to prevent the paper strip from following around the roll 44. If need be, a continuation of the paper feed trough 104 may be provided around the roll R, throughout the major portion of the circumference thereof, to direct this strip around the roll in tight relation therewith to form the lining 6, as shown in Fig. 30, by means of a paper guide cage 189 (Fig. 25).

One turn of the lining strip 101 is wound on the roll R at station I. This strip is pressed into the grooves 1 and 2 as it is applied and caused to adhere thereby to the roll R throughout the circumference thereof. When sufficient length of strip has been fed to the roll to enclose the latter in one turn thereof, the strip is severed by a flying shear device, generally designated at 111. This flying shear device, in the form shown, includes a housing having a guideway 112 therein, intersecting the paper feed trough 104 through which the paper is fed to the roll R. Slidably mounted in the guideway 112 is a shear blade 113 connected with a solenoid armature including a plunger 114, spring-pressed in one direction as indicated at 115. The solenoid is indicated at 116 which is adapted to be energized in properly-timed relation for shearing the lining strip 101, so as to cut therefrom the proper length of strip that will form one turn on the roll R.

At the station I, is fed also the initial side wall strip, generally indicated at 117, which is directed from a source of supply between a power driven feed roll 118 and an idler roll 119 carried by a spring-pressed arm 120 to urge the roll 119 against the feed roll 118. This strip 117 forms the side wall portion 9 in Fig. 30.

The strip 117 is guided through a paper feed trough 121 that leads to the bite between the rolls R and 44, in position to direct the strip of paper 117 to a point externally of the liner 6 when wound on the roll R at station I.

In the form illustrated, it is preferred to have three turns of the initial side wall strip 117 applied over the liner 6, as shown in Fig. 30. When a sufficient quantity of paper has been fed to the roll R for these three turns, the strip 117 is severed by a flying shear device 122, operated by an electro-magnet 123, and the remainder of the severed piece is then wound over the liner on the roll.

After the application of the inner side wall strip 9, the machine moves the thus-formed part to station II, which is shown in Fig. 13, where the roll R will be in cooperate bearing relation with thread roll 45.

At station II, a continuous strip of paper, indicated at 124, is fed between a power driven feed roll 125 and an idler roll 126, yieldably pressed thereagainst. From the rolls 125 and 126, the strip 124 is directed through a feed trough 127 to the bite of the rolls R and 45. When a sufficient quantity of paper has been fed through the trough 127 to form the three turns indicated at 12 in Fig. 31, the strip 124 is severed by a flying shear device 128, operated by an electro-magnet 129, and the remainder of the strip is then wound up to form the three turns indicated at 12 in Fig. 31.

From station II, the roll R is then moved to station III to receive additional turns of strip, as indicated at 15 in Fig. 32. This is provided by a continuous paper strip 130 directed between a power driven feed roll 131 and a yieldably pressed idler roll 132, bearing thereagainst, thence through a trough 133 to the bite between the roll R and the thread roll 46, as shown in Fig. 13. In the form illustrated, two turns of the strip 130 are applied in forming the side wall of the cap. When a sufficient quantity of strip has been fed forward toward the rolls for this purpose, the strip 130 is severed by a flying shear device 134, operated by an electro-magnet 135, and the severed section is then wound up to form the convolutions indicated at 15 in Fig. 32.

When a side decoration is desired on the outside of the side wall, as indicated at 17 in Fig. 34, this may be applied at station V.

A continuous paper strip is shown at 136, usually carrying some form of decoration or advertising material on the external face thereof. The strip 136 is directed between a power-driven feed roll 137 and a yieldably mounted idler roll 138, thence through a paper feed trough 139 to the bite between the rolls R and 47. One turn of the strip 136 is required around the outside of the side wall, and when this quantity of material has been fed toward the rolls, the strip 136 is severed by a flying shear device 140 operated by an electro-magnet 141.

At the several stations described and illustrated in Figs. 12 to 14, a pair of feed rolls is provided for each strip. This pair of feed rolls is constructed and mounted similar to the feed rolls 102—103, described more in detail above, except only for some variation in the form of mounting. Likewise, the flying shear device provided for each of the strips is similar to that described more in detail with respect to the device 111, and will function in like manner.

Provision is made for operating the power driven feed rolls 102, 118, 125, 131 and 137, in properly timed relation, as shown in Figs. 12 to 14, and in Fig. 8. The relative number of turns of these feed rolls will depend somewhat upon the number of turns of paper to be applied at the respective stations.

The feed roll 102 is mounted on a shaft 142 which extends transversely of the housing 22, as shown in Fig. 8. At its opposite end, the shaft 142 is connected through beveled gearing 143 to a shaft 144 that extends downwardly in the housing. The lower end of the shaft 144 is connected through beveled gearing 143' with a shaft 145 (Fig. 16).

Referring to Fig. 12, the driven roll 118 is mounted on a shaft 146 connected through beveled bearing 147 with a shaft 148. The shaft 148 extends to the feed roll 125, which latter is mounted on a shaft 149 connected through beveled gearing 150 with the shaft 148.

At its opposite end, the shaft 149 extends rearwardly in the housing 22 and is connected through beveled gearing 151 with an upright shaft 152 which in turn is geared through beveled gearing to a shaft 153 (Fig. 16).

The feed roll 131 is mounted on a drive shaft 154 which is connected through beveled gearing 155 with an upright shaft 156. The shaft 156 is connected through beveled gearing 157 with a shaft 158 (Fig. 16).

Referring to Fig. 14, the feed roll 137 is mounted on a shaft 159 connected through beveled gearing 159' with an upright shaft 160. The lower end of the shaft 160 is connected through beveled gearing 161 with a shaft 162 in axial alignment with the shaft 145 (Fig. 16).

The shafts 145, 153, 158 and 162 are power-driven in properly timed relation by mutilated gears 163, 164 and 165, journaled on a jackshaft 166. The gears 163 to 165 are driven respectively by gears 167, 167' and 168 mounted on the indexing shaft 82 described above (Figs. 7 and 8).

The gear 163 is connected through a beveled gear 169 with both of the shafts 145 and 162 to operate the feed rolls 102 and 137 through a distance that will supply one turn of paper to the rolls R, being approximately equal in amount.

The gear 164 operates the shaft 153 through beveled gearing 170, which in turn drives the feed rolls 118 and 125 at stations I and II, respectively. In the form shown, these feed rolls would be driven through a sufficient number of turns to feed lengths of strip to the threaded rolls R, to form three turns thereon.

The gear 165 drives the shaft 158 through beveled gearing 171, which is geared and connected with the feed roll 131 at station III. In this form, the strip 130 is fed to a sufficient extent to impart two turns to the threaded roll R at station III.

It will be evident that by a proper selection of gears according to the number of teeth to be used, as indicated at 163—168, any suitable or desired number of turns may be imparted to the feed rolls at the respective stations, varying from the number here indicated, as will be evident to a mechanic skilled in this art.

The gear unit shown in Fig. 16 will cause a feeding action of the paper strips positively throughout the full length of each strip to be fed between the rolls. If desired, however, it will be sufficient for each paper strip to be fed between the coacting rolls only sufficiently to insure of a secure grip thereon, after which the threaded roll R, and its coacting roll will pull the required length of paper therearound without the necessity for further feeding of the paper strip. This may be accomplished by the use of a gear assembly for each of the paper feed units, substantially as shown in Figs. 16a and 16b.

As illustrated, a pair of coacting gears 163' and 164' are arranged for intermeshing relation, but the gear 164' has only one tooth 165' in the form shown, or sufficient to intermesh with the teeth of the gear 163' to accomplish the desired length of feed of the strip without meshing continuously or through a substantial portion of the circumference thereof. One of these gears 163'—164' is mounted on the drive shaft 82, while the other is mounted on the shaft 166 (see Fig. 7).

Fixed to the gear 163' is a notched plate 166', the notches of which are curved complementary to a cylindrical rim 167' fixed to the gear 164' to hold these parts against accidental relative turning movement, except when positively driven. This unit will reduce the length of the driving action for feeding the paper strip as compared with multilated gears shown in Fig. 16, allowing only a short feeding action thereof.

*Top forming mechanism*

The top or end wall of the cap is shown in Fig. 29 as formed by the discs or sheets 3, 16 and 19, which are stamped out respectively from strips of paper or cardboard of the desired thickness. The liner disc 3 is applied to the end of the roll R, before the lining and side wall strips are applied thereto, as described above. This liner disc 3 is thus applied at station I, and is stamped out of a strip of relatively heavy cardboard, generally indicated at 172 in Figs. 1 and 17.

The strip 172 passes through an opening at one edge of the cover plate 29, thence over a power-driven feed roll 173 between the latter and an idler roll 174, thence out through a slot 175, in the front of the cover plate 29. The idler roll 174 is carried on an upstanding lever arm 176, as shown in Figs. 17 and 18, pivotally mounted at 177 on the front wall of the cover 29. A spring 178 bears upwardly on the lever arm 176 tending to press the roll 174 against the feed roll 173.

The feed roll 173 is shown in Fig. 7, as mounted on an upstanding shaft 179, journaled in bearings fixed to the front cover 29, the upper bearing being indicated at 180 and the lower bearing being formed in the bearing bracket 69. The shaft 179 is connected through beveled gearing 181 with a shaft 182 journaled in the bearing bracket 69, parallel with the shaft 66. The shaft 182 carries a pinion 183 meshing with a gear 184 fixed to the shaft 66 to impart driving rotation to the shafts 179 and 182 and the feed roll 173 for feeding the strip 172 through the machine.

As shown in Fig. 4, the strip 172 is preferably formed with notches or slots 185 spaced at intervals therealong, and the feed roll 173 preferably has ratchet teeth 186 in position to engage in the notches for positive feeding of the strip through the machine.

The strip 172 is directed through a guide slot 187 extending transversely from side-to-side of a punch device, generally indicated at 188. The punch device 188 includes a housing projecting through the cover plate 29 on which it is mounted as shown in Fig. 17.

At the forward end of the housing of the punch device 188, is a paper guide cage 189, carried by pins 190 slidably mounted in the housing 188, but normally retracted relative thereto by coiled springs 191 sleeved over the pins 190 (Fig. 25).

The pins 190, disposed on diametrically opposite sides of the punch device, are adapted to be engaged and moved forward by keys 192 carried by a slidable cylinder 193, slidably mounted in the housing of the punch device 188. The cylinder 193 surrounds a fixed piston rod 194 on which is fixed a piston, generally designated at 195, in sealing relation with the inner wall of the cylinder 193. The outer end of the piston rod 194 extends through the open end of the cylinder 193 and has packed sealing connection therewith, as indicated generally at 196, while the extreme end of said piston rod is secured rigidly to the end of the housing 188, as indicated at 197.

The forward end of the cylinder 193 carries a punch 198 journaled on the end of the cylinder 193 as at 199, capable of relative turning movement.

The punch device is pneumatically operated upon the admission of air under pressure alternately to either side of the fixed piston 195 acting in the cylinder 193 to move the latter axially relative to the piston and piston rod. This action will punch out a disc from the strip 172, and as forward movement of the cylinder 193 continues, will not only move this disc against the end of the threaded roll R, but will also move the cage 189 around the threaded roll to insure of the feeding of the lining strip therearound in the manner described above.

At station IV, the top disc 16 is applied under pressure, which disc is cut out of a continuous strip indicated at 200, in Figs. 1 and 19. The strip 200 is fed through an opening in the opposite side of the cover plate 29 from the strip 172, thence over a feed roll 201 and out through a slot 202 in the front wall of the cover plate.

The strip 200 may be constructed similar to the strip 172 and likewise fed by sprocket means through the slotted connections therewith. It is preferable to provide an idler roll 203 for holding the strip against the periphery of the feed roll 201, which idler roll may be carried by an arm 204, spring-pressed and mounted on the cover plate 29.

Figures 20, 21:
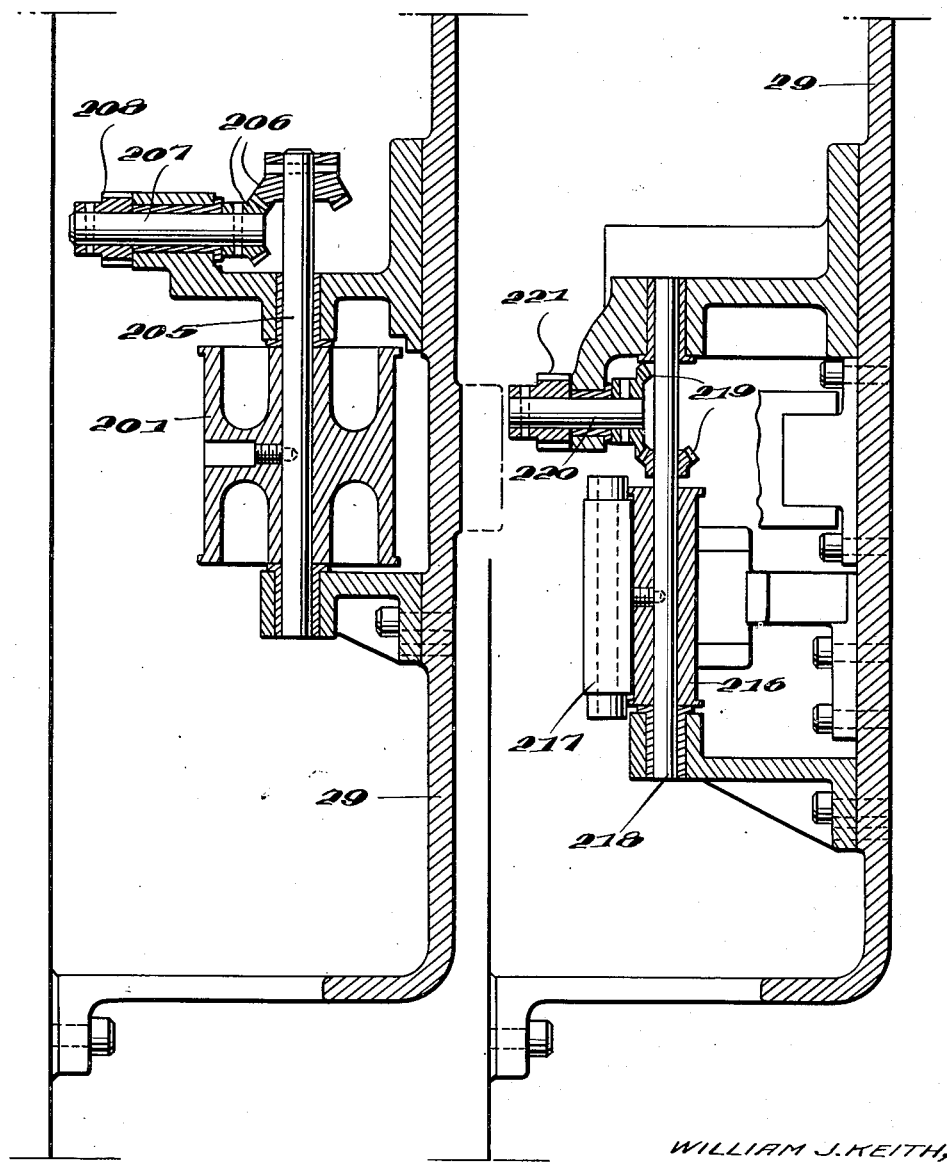
Fig. 20 is a vertical cross section therethrough on the line 20—20 of Fig. 15.
Fig. 21 is a similar view on the line 21—21 of Fig. 15.

As shown in Figs. 19 and 20, the feed roll 201 is mounted on an upright shaft 205 journaled in bearings on the cover plate 29. The shaft 205 is connected through beveled gearing 206 with a stub shaft 207 that extends parallel with the shaft 66. A pinion 208 fixed to the shaft 207 is in mesh with the drive gear 184 on the shaft 66 for operating the feed roll 201.

The strip 200 extends through a slot 209 (Fig. 27) in a punch device generally indicated at 210 mounted on the cover plate 29, which punch device is in position for axial alignment with the threaded roll R, when positioned at station IV. This punch device is constructed and operates generally as described above in connection with the punch device 188, by pneumatic action. It includes a punch 211 in position to engage and punch out a disc corresponding with the disc 16 in Fig. 33 from the strip 200. The punch 211 is journaled at 212 on one end of a power-operated cylinder 213 within which cylinder is mounted a stationary piston 214. The cylinder 213 is moved axially in either direction as air is admitted under pressure to either side of the piston 214 within the cylinder. This punch will be operated in properly timed relation to cut-out a disc and apply it to the top portion of the cap when presented to station IV.

At station VI, the top decoration disc 19 is applied as shown in Fig. 35, being stamped out of a continuous strip of paper 215, as shown in Figs. 1 and 19. The strip 215 extends over a power-driven feed roll 216 (Fig. 21) against which the strip is held by an idler roll 217, yieldably held pressed against the feed roll 216, generally in the manner described above in connection with the roll 174. The feed roll 216 is mounted on a shaft 218 supported in bearings on the cover plate 29. The shaft 218 is connected through beveled gearing 219 with a stub shaft 220 extending parallel with the shafts 66 and 207. The shaft 220 carries thereon a pinion 221 in mesh with the driving gear 184 on the shaft 66 (see Fig. 7). The strip 215 extends through a slot 222 (Fig. 26), in a power punch device 223, similar in structure and manner of operation to the punch devices described above as designated 188 and 210. The punch device 223 includes a punch 224 operatively connected with a reciprocating cylinder 225, within which a fixed piston 226 has sealing relation. When air is admitted to either side of the piston 226, within the cylinder 225, reciprocating movement of the latter is caused to move the punch 224 forward to punch out a disc from the paper strip 225 or to retract the punch therefrom.

The paper strips that form the top discs of the cap are stamped out of continuous strips, leaving the remaining surplus strips for feeding through and out of the cover plate 29. The strip 215 passes out through a slot 226 (Fig. 15). It is preferred that each of these strips be formed with notches in edge portions thereof, to provide for sprocket feed of the strips in the machine for uniformity of speed and discharge of the surplus material from the machine, which surplus may be directed into a vacuum chute or other means for conveying the surplus paper away from the machine without allowing it to accumulate thereat. This method of feeding also enables the adhesive portions on the strips 200 and 215 to be spotted only on the areas that are to be stamped out, effecting not only a saving of the adhesive itself, but also permitting salvage of paper which would be interfered with by a surface coating of adhesive thereover.

The adhesive on the top discs 16 and 19 is preferably of the type described above, thermo-plastic synthetic resin, and will be heated by passage over a source of radiated heat on the machine to soften the adhesive before applying and to cause adhesion of the top discs to the remainder of the structure.

The completed caps are adapted to be removed from the machine automatically at station VII by an extractor unit generally designated at 227, secured to the cover plate 29, as shown in Fig. 28. The extractor assembly 227 includes a reciprocating cylinder 228, enclosing therein a fixed piston 229 secured by a piston rod 230 to one end of the casing 231 of the assembly. The piston rod 230 has an air passageway 232 therethrough to the inner side of the piston 229. The opposite side of the piston 229 has a spring 233 abutting thereagainst and interposed between said fixed piston and one end of the reciprocating cylinder 228, normally tending to retract the cylinder to the position shown in Fig. 28.

At its forward end, the cylinder 228 has a conical face 234 in embracing relation with a reduced portion 235 of a chuck 236. The reduced portion 235 thereof is telescoped into the reciprocating cylinder 228 and keyed thereto for relative longitudinal movement. The chuck is also pinned at 237 to the end of the assembly casing 231, which pin is fixed to the assembly casing. The chuck is longitudinally split and capable of circumferential contraction and expansion. Upon axial movement of the reciprocating cylinder 228 relative to the chuck 236, the conical face 234 thereof exerts a compression action on the split reduced portion 235, whereby the chuck 236 is contracted and capable of embracing and holding a cap therein.

The chuck 236 is disposed normally in its retracted position on the opposite side of a chute, generally designated at 238, at station VII, from the roll R, which chute extends into the cover plate 29, as shown in Fig. 15. The chute is open at opposite sides for movement of the chuck 236 therethrough transversely for the purpose of grasping and holding a cap that is applied to the roll R and permitting the roll to turn for unscrewing the cap therefrom.

When air under pressure is admitted to the axial passageway 232 in the piston rod 230, thence to the forward side of the piston 229, this pressure will force the reciprocating cylinder 228 in a forward direction. This action will cause the cylinder to push the chuck 236 forward relative to the casing 231, through the openings in opposite sides of the chute 238, thence over the cap that is screw-threaded on the roll R at station VII. When the cap has been pressed into engagement with the surface 239 in the chuck 236, the chuck will not move further in an axial direction, whereby the continued forward movement of the cylinder 228 will cause the conical portion 234 thereof to contract the reduced portion 235 and likewise the chuck into embracing grasping relation with the cap, holding it against rotation with the roll R. This will allow the roll to continue rotating relative to the cap and thereby unscrew the cap from the roll, releasing it therefrom. When the air pressure is released from the cylinder 228, the spring 233 retracts the cylinder, also pulling back on the chuck 236, in a quick motion, moving the cap with it away from the roll R. When the cap strikes the pin 237, it will be ejected from within the chuck 236 and drop into the chute 238 for discharge from the machine.

The punch devices 188, 210 and 223 and the ejecting device 227 are preferably operated pneumatically under the control of a timer device 240, operated in synchronism with the operation of the machine by a chain connection 241 (Fig. 7) from the indexing drive shaft 82. This timer assembly is constructed not only for timing the operation of these power devices but also includes limit switches that control the operation of the shearing devices 111, 122, 128, 134 and 140.

*Operation*

While the operation of the various portions of the machine has been set forth heretofore, in recapitulation, the operation of the various units will be described in co-relation to each other.

The operating parts of the machine are driven from the motor 92 which drives directly the shaft 89 that is geared with the indexing shaft 82.

The shaft 82 is operatively connected through the gearing 87, 93 and 94 with the gear wheel 96. The gear wheel 96 is geared at 98, 34, to drive the threaded rolls R at each station of the machine. The gear wheel 96 is also geared at 99, 100, 65, with each of the rolls 44-47 (Fig. 5) at stations I, II, III and V, to operate these in properly timed relation.

The shaft 82 also carries the lever 80 that moves the indexing plate 72, step-by-step when released by the solenoid latch 74 under control of the limit switch 86, to allow one step in advance of the indexing wheel 31, from one station to another, and then to latch these parts in their set positions for one cycle of operation.

As set forth, the various steps in the building of the paper cap shown in Figs. 30 to 35, occur simultaneously at the respective stations I-VI, and simultaneously with each other.

When an empty threaded roll R is presented to station I, the first step is to apply the liner disc 3 to the end of the threaded roll R, which is caused by the punch device 188 (Fig. 25). The admission of air to the reciprocating cylinder 193 on the forward side of the stationary piston 195 will force the punch 198 forward to punch out the disc 3 from the strip 172. Simultaneously, the paper guide cage 189 will be advanced over and around the threaded roll R at station I where it will remain while the feed roll 102 (Fig. 12) advances the strip 101 to feed a length of paper around the roll R within the cage, sufficient to form one turn around the roll for the lining 6 in Fig. 30. Immediately thereafter, the feed roll 118 advances the strip 117 through a sufficient distance to feed three turns around the lining strip 6 on the roll R, as indicated at 9 in Fig. 30. These strips are adhesively secured together and in their respective convolutions by heat from the heating element 61 (Fig. 23) in the threaded roll 44, which threaded roll coacting with the grooves in the roll R, presses each layer successively one into another to form the thread groove 10 and the circumferential groove 11 in the side wall as formed.

Simultaneously therewith at station II, the next preceding threaded roll R is receiving a length of strip 124 fed by the feed roll 125 sufficient to form the layers 12 in Fig. 31. The coacting thread roll 45 presses into each successive convolution the thread groove 13. During the rotation of the thread roll 45, the enlarged skirt (Fig. 24a) thereon rolls over the edge of the lining strip 6, as shown at 14 in Fig. 31.

In the meantime, at station III, the feed roll 131 advances the strip 130 to feed a length of paper sufficient for the two turns 15 in Fig. 32 to the next succeeding threaded roll R. The coacting roll 46 (Fig. 13) is smooth because it is not necessary to roll the thread groove in these plies 15.

At station IV, the top disc 16 is applied, being punched out of the strip 200 that has been advanced one step by the feed roll 201. This top disc 16 is punched out by the punch 211 (Fig. 27) and pressed into adhesive secure relation over the liner disc 3 and the edges of the side wall 8, 12, 15, as shown in Fig. 33.

At station V, the side decoration 17 is applied as shown in Fig. 34. This is formed by cutting a length from a continuous strip 136 fed by the roll 137 to the threaded roll R. The upper edge of the strip 17 is turned over the edge of the top disc 16, as shown at 18 in Fig. 34, by the skirt portion of the roll 47 acting thereon.

The threaded roll R at station VI receives the top decoration 19, which is stamped out of the strip 215 by the punch device 223 (Fig. 25) and pressed into place and adhesive connection with the structure formed according to the preceding operations. At the same time, at station VI, the wheels 35 and 36 (Fig. 10) are advanced by the engagement successively of the shoes 39 on the plungers 37 carrying said wheels, with the beveled edge 43 of the cam 40, first to fold up the projecting lower portion of the lining strip 6, as indicated at 20, and then to bend the extreme edge thereof around the outside of the side decoration 17, as shown in Fig. 35.

At station VII, the completed cap is picked off the threaded roll R by the chuck 236 which is advanced over the cap thereon by the reciprocating cylinder 228, and then retracted by the spring 233. The cap enclosed within the chuck 236 is ejected therefrom by the pin 237 and drops into and through the chute 238, where it is discharged from the machine.

It is possible through this means and the successive step-by-step operation as described to build paper caps with great rapidity, at high speed on the machine, and yet provide caps made from paper which have strength and sealing properties, useful for various containers that are superior to many materials now in use and at greatly reduced cost. At the same time, these lend themselves to decoration that has not been possible with many other caps in use heretofore.

While the invention is illustrated and described in one embodiment, it is recognized that this is merely illustrative of the invention and that variations and changes may be made therein without departing from the invention, except as specified in the claims.

I claim:

1. In a cap making machine, the combination of a forming roll having a circumferential groove in the periphery thereof and adapted to receive a strip of material wound in multiple convolutions on the periphery of the roll, and means for embossing the strip of material in each layer thereof as applied to the roll to form securing means on the inner surface thereof.

2. In a machine for forming a closure cap, the combination of a winding roll having a circumferentially extending groove in the periphery thereof and adapted to receive a strip of material in multiple layers coiled thereon, and means for embossing a groove in each layer of said material as applied to the roll pressing the material into the groove in the roll and forming an integral securing means at the inner surface of the cap.

3. In a machine for making a closure cap, the combination of a winding roll having a circumferentially extending helical groove in the periphery thereof and adapted to receive at least one layer of thin non-metallic flexible material coiled around the roll and forming multiple layers thereon, and means for embossing a thread groove in each layer of said material into the groove of the roll to form a thread projection at the inner side thereof.

4. In a cap making machine, the combination of a forming roll having a circumferential groove in the periphery thereof and adapted to receive a strip of material wound in multiple convolutions on the periphery of the roll, and means having a portion thereon arranged to interfit in complementary relation with said groove for embossing the strip of material in each layer thereof as applied to the roll to form securing means on the inner surface thereof.

5. In a cap making machine, the combination of a forming roll having a circumferential groove in the periphery thereof and adapted to receive a strip of material wound in multiple convolutions on the periphery of the roll, and a second roll having a rib on the periphery thereof arranged in complementary relation with said groove for embossing the strip of material in each layer thereof as applied to said first-mentioned roll to form securing means on the inner surface thereof.

6. In a machine for making a closure cap, the combination of a pair of coacting rolls arranged in peripheral bearing relation to each other, one of said rolls having a circumferential thread groove in the periphery thereof and adapted to receive a strip of thin non-metallic flexible material coiled therearound to form a side wall of the cap, and the other roll having a thread-forming rib thereon complementary with the thread-forming groove and arranged for embossing a thread groove in the material as coiled on the first-mentioned roll to form a thread at the inner side of the cap.

7. In a machine for making a closure cap, the combination of a pair of coacting rolls arranged in peripheral bearing relation to each other, one of said rolls having a circumferential thread groove in the periphery thereof and adapted to receive a strip of thin non-metallic flexible material coiled therearound to form a side wall of the cap, and the other roll having a thread-forming rib thereon complementary with the thread-forming groove and arranged for embossing a thread groove in the material as coiled on the first-mentioned roll to form a thread at the inner side of the cap, and means for rotating said rolls at the same circumferential speed for uniformly pressing said thread groove in the strip.

8. In a machine for making a closure cap, the combination of a pair of coacting rolls arranged in peripheral bearing relation to each other, one of said rolls having a circumferential thread groove in the periphery thereof and adapted to receive a strip of thin non-metallic flexible material coiled therearound to form a side wall of the cap, and the other roll having a thread-forming rib thereon complementary with the thread-forming groove and arranged for embossing a thread groove in the material as coiled on the first-mentioned roll to form a thread at the inner side of the cap, and means mounted in the second-mentioned roll for heating the material as wound on the first-mentioned roll to cause an adhesive connection therebetween.

9. In a machine for making a closure cap, the combination of a pair of coacting rolls arranged in peripheral bearing relation to each other, one of said rolls having a circumferential thread groove in the periphery thereof and adapted to receive a strip of thin non-metallic flexible material coiled therearound to form a side wall of the cap, and the other roll having a thread-forming rib thereon complementary with the thread-forming groove and arranged for embossing a thread groove in the material as coiled on the first-mentioned roll to form a thread at the inner side of the cap, and means mounting the second-mentioned roll for bodily movement toward and from the first-mentioned roll and for yieldably pressing the second-mentioned roll toward said first-mentioned roll.

10. In a machine for making a closure cap, the combination of a rotatable indexing wheel, a plurality of winding rolls operatively mounted thereon and spaced circumferentially around the wheel, means mounted in relatively fixed positions for supplying strips of thin flexible material to a plurality of said rolls for winding thereon, and rolls cooperating with the last-mentioned rolls in predetermined positions for applying pressure to the material being wound thereon, said coacting rolls having inter-connected means therebetween for forming a thread groove in the material being wound on the first-mentioned rolls during the winding action thereof.

11. In a machine for making a closure cap, the combination of means for winding up a strip of relatively thin material to form a side wall, means for forming detachable fastening means integral with the side wall simultaneously during the formation thereof, means for applying a top disc to the side wall, and means for interconnecting the top disc with the side wall in permanent secure relation.

12. In a machine for making a closure cap, the combination of means for winding up a strip of relatively thin material to form a side wall, means for forming detachable fastening means integral with the side wall simultaneously during the formation thereof, means for applying a top disc to the side wall, means for interconnecting the top disc with the side wall in permanent secure relation, said top disc applying means including means for feeding a strip of material transversely relative to the axis of the side wall, and means for punching out a disc from said last-mentioned strip and directing said disc into cooperating relation with the side wall forming means.

13. In a machine for making a closure cap, the combination of means for winding up a strip of relatively thin material to form a side wall, means for forming detachable fastening means integral with the side wall simultaneously during the formation thereof, means for applying a top disc to the side wall, means for interconnecting the top disc with the side wall in permanent secure relation, said top disc applying means including means for feeding a strip of material transversely relative to the axis of the side wall, and means for punching out a disc from said last-mentioned strip and directing said disc into cooperating relation with the side wall forming means, said punching means including a fluid actuated power device and a punch connected therewith for operation thereby in position to operate through the strip to sever the disc therefrom and to move the disc into cooperative relation with the side wall forming means.

14. In a machine for making a closure cap, the combination of means for winding up a strip of relatively thin material to form a side wall, means for forming detachable fastening means integral with the side wall simultaneously during the formation thereof, means for applying a top disc to the side wall, means for interconnecting the top disc with the side wall in permanent secure relation, said top disc applying means including means for feeding a strip of material transversely relative to the axis of the side wall, means for punching out a disc from said last-mentioned strip and directing said disc into cooperating relation with the side wall forming means, said strip feeding means including a power-driven feeding roll, and means forming an interconnection between said roll and the strip for operatively feeding of the strip thereby.

15. In a machine for making a closure cap, the combination of a winding roll adapted to receive a strip of material therearound to form a side wall of the closure cap, means for forming a screw thread in the side wall in interfitting relation with the roll, means for rotating said roll, and a chuck for embracing and seizing the side wall to cause an unscrewing of the cap therefrom upon rotation of the roll.

16. In a machine for making a closure cap, the combination of a winding roll adapted to receive a strip of material therearound to form a side wall of the closure cap, means for forming a screw thread in the side wall in interfitting relation with the roll, means for rotating said roll, a chuck for embracing and seizing the side wall to cause an unscrewing of the cap therefrom upon rotation of the roll, fluid actuated means for moving the chuck into engaging relation with the cap on the roll, and means for ejecting the cap from the chuck upon disconnection thereof from the roll.

17. In a machine for making a closure cap, the combination of a roll mounted for rotating movement and constructed for receiving a strip of material therearound to form the side wall of the cap, means mounting said roll for bodily movement to different positions, a cage adapted to extend about the roll to direct the material therearound, and means mounting said cage for movement over and around the roll in one position thereof and for retracting the cage therefrom before movement of the roll to a second position.

18. In a machine for making a closure cap, the combination of a pair of coacting rolls mounted for relative turning movement and adapted to receive a strip of material therebetween in winding relation with one of the rolls, and a disc having an edge portion in bearing relation with the other roll for separating the strip therefrom against adherence to said second-mentioned roll and to direct said strip around the first-mentioned roll.

WILLIAM J. KEITH.

REFERENCES CITED

The following references are of record in the file of this patent:

UNITED STATES PATENTS

| Number | Name | Date |
|---|---|---|
| 1,134,808 | Beadle | Apr. 6, 1915 |
| 1,429,324 | Carle | Sept. 19, 1922 |
| 1,444,096 | Beadle | Feb. 6, 1923 |
| 1,580,375 | Hulbert | Apr. 13, 1926 |
| 1,586,977 | Donnellan | June 1, 1926 |
| 1,922,189 | Angell | Aug. 15, 1933 |
| 2,223,209 | Groh et al. | Nov. 26, 1940 |
| 2,333,056 | Thoreson et al. | Oct. 26, 1943 |
| 2,333,059 | Tucker | Oct. 26, 1943 |
| 2,390,721 | Mallgraf | Dec. 11, 1945 |